(12) United States Patent
Kasama et al.

(10) Patent No.: US 8,021,271 B2
(45) Date of Patent: Sep. 20, 2011

(54) WALKING EXERCISE SUPPORTING DEVICE

(75) Inventors: Kouichirou Kasama, Kawasaki (JP);
Hiroshi Kanno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/585,954

(22) Filed: Sep. 29, 2009

(65) Prior Publication Data
US 2010/0022352 A1    Jan. 28, 2010

(51) Int. Cl.
*A63B 71/00* (2006.01)

(52) U.S. Cl. .............................. 482/8; 482/9

(58) Field of Classification Search .............. 482/1–8; 600/587, 595; 702/160, 141, 176
See application file for complete search history.

(56) References Cited

U.S. PATENT DOCUMENTS

| | | | | |
|---|---|---|---|---|
| 6,339,746 B1* | 1/2002 | Sugiyama et al. | ............ | 701/209 |
| 6,546,336 B1* | 4/2003 | Matsuoka et al. | ............ | 701/213 |
| 6,571,200 B1* | 5/2003 | Mault | ............ | 702/182 |
| 6,790,178 B1* | 9/2004 | Mault et al. | ............ | 600/300 |
| 6,839,626 B2* | 1/2005 | Yamakita et al. | ............ | 701/207 |
| 7,558,526 B2* | 7/2009 | Guo | ............ | 455/3.06 |
| 7,736,272 B2* | 6/2010 | Martens | ............ | 482/8 |
| 2001/0049470 A1 | 12/2001 | Mault et al. | ............ | 600/300 |
| 2004/0209600 A1 | 10/2004 | Werner et al. | ............ | 455/414.1 |
| 2007/0032344 A1* | 2/2007 | Guo | ............ | 482/8 |
| 2007/0197274 A1* | 8/2007 | Dugan | ............ | 463/7 |
| 2008/0114538 A1* | 5/2008 | Lindroos | ............ | 701/208 |
| 2008/0182723 A1* | 7/2008 | Aaron et al. | ............ | 482/8 |
| 2009/0163322 A1* | 6/2009 | Andren et al. | ............ | 482/8 |
| 2009/0319230 A1* | 12/2009 | Case et al. | ............ | 702/182 |
| 2010/0056340 A1* | 3/2010 | Ellis et al. | ............ | 482/4 |
| 2010/0056341 A1* | 3/2010 | Ellis et al. | ............ | 482/9 |

FOREIGN PATENT DOCUMENTS

| | | |
|---|---|---|
| JP | 1-100416 | 4/1989 |
| JP | 8-68846 | 3/1996 |
| JP | 8-247777 | 9/1996 |
| JP | 10-148539 | 6/1998 |
| JP | 2001-296137 | 10/2001 |
| JP | 2001-317960 | 11/2001 |
| JP | 2002-277278 | 9/2002 |
| JP | 2004-28674 | 1/2004 |
| JP | 2004-109100 | 4/2004 |
| JP | 2007-57510 | 3/2007 |

OTHER PUBLICATIONS

International Search Report for PCT/JP2007/057052, mailed Jun. 26, 2007.

* cited by examiner

*Primary Examiner* — Fenn C Mathew
(74) *Attorney, Agent, or Firm* — Staas & Halsey LLP

(57) ABSTRACT

A device can search for an appropriate walking route with an exercise condition such as of the calorie consumption and the walking speed. When a user enters information at least on the walking time, calorie consumption, walking speed, and distance as the exercise condition, the exercise condition is stored in a data storage unit of the device. When the user enters position information on the walking start point and the walking end point, the position information is also stored in the storage unit of the device. Map information is also previously stored in the data storage unit. A route searching unit of the device searches for the walking route and determines it according to the stored exercise condition, the position information and the map information. The determined walking route is presented to the user through a presenting unit of the device.

10 Claims, 18 Drawing Sheets

| WALKING SPEED (m/min) | METs |
|---|---|
| 30 | 2.0 |
| 40 | 2.2 |
| 50 | 2.4 |
| 60 | 2.7 |
| 70 | 3.0 |
| 80 | 3.3 |
| 90 | 3.7 |
| 100 | 4.4 |
| 110 | 5.2 |
| 120 | 7.0 |
| 130 | 7.6 |
| 140 | 8.3 |
| 150 | 9.0 |
| 160 | 10.0 |

Figure 2

| WALKING TIME (min) | CALORIE CONSUMPTION (kcal) | NUMBER OF STEPS (step) | WALKING SPEED (m/min) | DISTANCE (m) | START POSITION | END POSITION |
|---|---|---|---|---|---|---|
| 60 | 300 | 5000 | 100 | 6000 | 35d40m35sN 139d46m60sE | 40d50m60sN 150d55m70sE |
| PRIORITY 1 | 2 | 4 | 5 | 3 | — | — |

Figure 3

| RISING GRADIENT (%) | EXERCISE INTENSITY AUGMENTATION FACTOR |
|---|---|
| 0 | 1.00 |
| 3 | 1.40 |
| 6 | 2.07 |
| 10 | 3.20 |
| 12 | 4.20 |
| 14 | 5.60 |
| 16 | 6.67 |
| 18 | 7.07 |
| 20 | 8.53 |
| 22 | 9.47 |

Figure 6

| | WALKING TIME (min) | CALORIE CONSUMPTION (kcal) | NUMBER OF STEPS (step) | WALKING SPEED (m/min) | DISTANCE (m) | GRADIENT (%) | START POSITION | END POSITION |
|---|---|---|---|---|---|---|---|---|
| | 60 | 300 | 5000 | 100 | 6000 | 10 | 35d40m35sN 139d46m60sE | 40d50m60sN 150d55m70sE |
| PRIORITY | 1 | 2 | 6 | 5 | 4 | 3 | — | — |

Figure 7

| POSITION ID | LATITUDE/ LONGITUDE | HEIGHT (m) | DISTANCE (m) | HEIGHT DIFFERENCE (m) | GRADIENT (%) |
|---|---|---|---|---|---|
| 1 | 35d40m35sN 139d46m60sE | 30 | — | — | — |
| 2 | 37d55m40sN 140d50m40sE | 30 | 20 | 0 | 0 |
| 3 | 39d57m50sN 140d55m46sE | 31 | 20 | 1 | 5 |
| ⋮ | ⋮ | ⋮ | ⋮ | ⋮ | ⋮ |
| 102 | 40d50m60sN 150d55m70sE | 41 | 20 | 3 | 15 |

Figure 12

WALKING EXERCISE SUPPORTING DEVICE

CROSS-REFERENCE TO RELATED APPLICATIONS

This application is based upon and claims the benefit of priority of the prior PCT International Application PCT/JP2007/057052, filed on Mar. 30, 2007, the entire contents of which are incorporated here in by reference.

FIELD

A certain aspect of the embodiments disclosed herein is related to a walking exercise supporting device, and more specifically, to a walking exercise supporting device that supports a walking exercise of a user by searching for a walking route based on exercise conditions specified by the user.

BACKGROUND

Conventionally, as a technique for providing route guidance to a user, for example, Patent Document 1 described below discloses a route guidance system for searching route information on a facility that is a destination based on user information entered by the user such as road type, transportation unit, walking restrictions of the user, and the like.

In addition, for example, Patent Document 2 described below discloses a navigation system that presents a route that achieves a target calorie consumption using geodetic information and map information.

Patent Document 1: Japanese Patent Laid-Open No. 2002-277278
Patent Document 2: Japanese Patent Laid-Open No. 2004-109100

The conventional art described in Patent Document 1 above requires, as user information, information on road type such as a flat road, a steep gradient, a stairway, a slope, and a bump, information on transportation means such as a vehicle, a bicycle, and walking, and information on walking constraints such as a physically unimpaired person, a senior citizen, and a wheelchair user. Therefore, when realizing a route guidance system using, for example, a mobile phone, there is a problem in that the capacity of information to be stored in the mobile phone becomes excessive.

In addition, the technique described in Patent Document 1 above does not perform route searching based on exercise conditions such as walking time, calorie consumption, walking speed, and distance. Furthermore, the technique disclosed in Patent Document 1 above is a technique for searching for a route that avoids a potential obstacle for a user when walking to a destination, such as searching for a route that does not pass through a staircase when the user is a wheelchair user, and does not involve searching for a route that achieves calorie consumption amount specified by a user.

Moreover, route searching according to the conventional art described in Patent Document 2 above is dependent on position and height information from a geodetic meter, and calorie consumption value calculated by the conventional art is greatly affected by the accuracy of the geodetic meter. However, since a geodetic meter is generally only accurate to within several tens of meters, the accuracy of the calculated calorie consumption value is low.

In addition, both the technique described in Patent Document 1 above and the technique described in Patent Document 2 above do not involve presenting a user with calorie consumption per walking speed of the user when the user walks along a specified walking route.

Furthermore, both the technique described in Patent Document 1 above and the technique described in Patent Document 2 above do not involve searching for a walking route based on a specified exercise condition, verifying whether a user is able to perform exercise according to the exercise condition used for searching for the walking route when the user is walking the walking route, and presenting the same to the user.

Moreover, both the technique described in Patent Document 1 above and the technique described in Patent Document 2 above do not involve determining a body condition of the user when a user is walking a walking route and providing guidance regarding exercise to the user based on a judgment result of the body conditions of the user, or changing an exercise condition based on the judgment result of the body condition of the user and re-searching for a walking route based on a changed exercise condition.

SUMMARY

A walking exercise supporting device disclosed herein is a device for supporting a walking exercise of a user, and comprises: an exercise condition acquiring unit for acquiring information on at least a walking time, calorie consumption, and distance as an exercise condition and storing the same in a storage unit; a walking start point/walking end point acquiring unit for acquiring position information on a walking start point and a walking end point and storing the same in the storage unit; a walking route searching unit for searching for and determining a walking route to be presented to the user based on the walking condition stored in the storage unit, position information on the walking start point and the walking end point, and map information previously stored in the storage unit; and a presenting unit for presenting a walking route determined by the walking route searching unit to the user.

In the walking exercise supporting device disclosed herein, the walking route searching unit can determine a walking route search range based on the distance, position information on the walking start point and the walking end point, and the map information stored in the storage unit; calculate a walking time, calorie consumption, and distance corresponding to each walking route within the search range based on the walking time, distance, and map information stored in the storage unit; and determine a walking route whose calculated walking time, calorie consumption, and distance are respectively consistent with the walking time, calorie consumption, and distance stored in the storage unit as the walking route to be presented to the user.

In the walking exercise supporting device disclosed herein, the exercise condition acquiring unit further can set priorities for the respective pieces of information on a walking time, calorie consumption, and distance entered as an exercise condition, and the walking route searching unit: determines a walking route search range based on the distance, position information on the walking start point and the walking end point, and the map information stored in the storage unit; calculate a walking time, calorie consumption, and distance corresponding to each walking route within the search range based on the walking time, distance, and map information stored in the storage unit; select a search criterion from the walking time, calorie consumption, and distance stored in the storage unit based on the set priorities; and determine a walking route corresponding to a walking time, calorie consumption, or distance consistent with the selected search criterion as the walking route to be presented to the user.

In the walking exercise supporting device disclosed herein, the exercise condition acquiring unit can acquire information on at least a walking time, calorie consumption, a walking speed, a distance, and a maximum gradient of a walking route as the exercise condition, and the walking route searching unit: determines a walking route search range based on the distance, position information on the walking start point and the walking end point, and map information stored in the storage unit; calculate a walking time, calorie consumption, distance, and maximum gradient corresponding to each walking route within the search range based on the walking time, distance, and map information stored in the storage unit; and determine a walking route whose calculated walking time, calorie consumption, distance, and maximum gradient are respectively consistent with the walking time, calorie consumption, distance, and maximum gradient stored in the storage unit as the walking route to be presented to the user.

In the walking exercise supporting device disclosed herein, the exercise condition acquiring unit can acquire information on at least a walking time, calorie consumption, a walking speed, a distance and a maximum gradient of a walking route as the exercise condition, and set priorities for the respective pieces of entered information on the walking time, calorie consumption, distance, and maximum gradient; and the walking route searching unit can determine a walking route search range based on the distance, position information on the walking start point and the walking end point and the map information stored in the storage unit, and calculate a walking time, calorie consumption, distance and maximum gradient corresponding to each walking route within the search range based on the walking time, distance and map information stored in the storage unit, and select a search criterion from the walking time, calorie consumption, distance and maximum gradient stored in the storage unit based on the set priorities; and determine a walking route corresponding to a walking time, calorie consumption, distance, or maximum gradient consistent with the selected search criterion as the walking route to be presented to the user.

The walking exercise supporting device disclosed herein may further comprise: a route information acquiring unit for acquiring information on a walking route from a walking start point to a walking end point, and extracting, from map information previously stored in the storage unit, information on the latitude, longitude, and height of respective reference points on the entered walking route and storing the same in the storage unit; and a calorie consumption calculating unit for calculating gradients between respective reference points based on the information on the latitude, longitude, and height of the respective reference points stored in the storage unit, and calculating, based on the calculated gradients between the respective reference points and respective walking speeds obtained by varying the value of a predetermined walking speed, the calorie consumption of the user when walking the walking route entered by the route information acquiring unit for each of the walking speeds, wherein the presenting unit further presents the calculated calorie consumption for each walking speed to the user.

The walking exercise supporting device disclosed herein may further comprise: a position information acquiring unit for acquiring position information on a walking user at predetermined time intervals, and based on the acquired position information on the user per predetermined time intervals, calculating a walking speed of the walking user; and a judging unit for judging whether the acquired position information on the walking user is consistent with a walking route determined by the walking route searching unit, and judging whether the calculated walking speed of the walking user is consistent with the walking speed stored in the storage unit by the exercise condition acquiring unit, wherein the presenting unit further presents the respective judgment results by the judging unit to the walking user.

The walking exercise supporting device disclosed herein may further comprise: a body condition acquiring unit for acquiring information on a body condition of a walking user; a body condition judging unit for comparing the acquired information on the body condition of the walking user with a predetermined threshold and, based on the comparison result, judging the body condition of the walking user; and a guidance information generating unit for generating guidance information in accordance with the judgment result of the body condition of the walking user, wherein the presenting unit presents guidance information in accordance with the judgment result of the body condition of the walking user to the user.

In the walking exercise supporting device disclosed herein, the body condition judging unit can update the exercise condition of a walking user based on the judgment result of the body condition of the walking user, and the walking route searching unit further can re-search for a walking route to be presented to the user using the updated exercise condition of the user.

With the walking exercise supporting device disclosed herein, it is now possible to search for an appropriate walking route under an exercise condition such as a walking time, calorie consumption, number of steps, walking speed, and distance.

In addition, with the walking exercise supporting device disclosed herein, it is now possible to present calorie consumption per walking speed to a user when the user walks along a specified walking route.

Furthermore, with the walking exercise supporting device disclosed herein, it is now possible to search for a walking route based on an exercise condition, and when a user is walking the walking route, present whether the user is able to perform exercise according to the exercise condition used for searching for the walking route to the user.

Moreover, with the walking exercise supporting device disclosed herein, it is now possible to judge a body condition of a walking user, and based on the judgment results of the body condition of the user, present guidance information to the user. Therefore, for example, when the body of a user is under an excessive load such as when the user has a fast pulse, it is now possible to prompt the user to lower the walking speed.

In addition, with the walking exercise supporting device disclosed herein, it is now possible to judge a body condition of a walking user, change an exercise condition based on the judgment results of the body conditions of the user, and re-search for a walking route based on the changed exercise condition. Therefore, for example, when the body of a user is under an excessive load, it is now possible to re-search for a route that poses a lighter load on the body of the user and present a new walking route obtained as a result of the re-search to the user.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating an example of an exercise intensity calculation table;

FIG. 3 is a diagram illustrating an example of a search condition data table;

FIG. 6 is a diagram illustrating an example of correspondence information between rising gradients and exercise intensity augmentation factors;

FIG. 7 is a diagram illustrating an example of a search condition data table;

FIG. 12 is a diagram illustrating an example of a route information data table;

DESCRIPTION OF EMBODIMENTS

Figure 1:
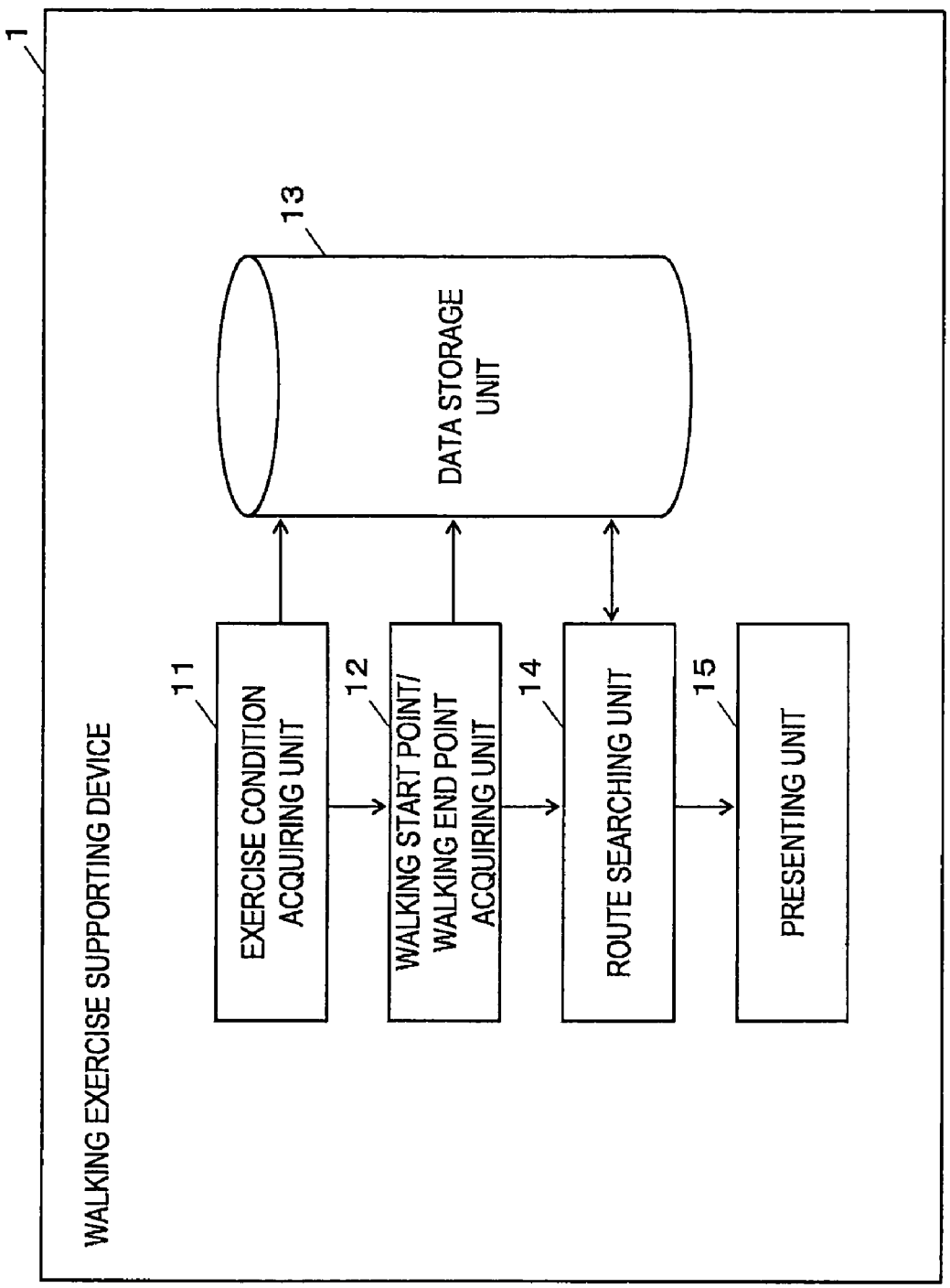
FIG. 1 is a diagram illustrating a device configuration example according to a first embodiment of the walking exercise supporting device disclosed herein.

Embodiments of a walking exercise supporting device disclosed herein will now be described with reference to the drawings. FIG. 1 is a diagram illustrating a device configuration example according to a first embodiment of the walking exercise supporting device disclosed herein. A walking exercise supporting device 1 is a processing device for supporting a walking exercise of a user. The walking exercise supporting device 1 is, for example, a terminal device such as a mobile telephone carried around by the user.

The walking exercise supporting device 1 includes an exercise condition acquiring unit 11, a walking start point/walking end point acquiring unit 12, a data storage unit 13, a route searching unit 14, and a presenting unit 15.

The exercise condition acquiring unit 11 acquires information on a walking time, calorie consumption, number of steps, walking speed, and distance as exercise conditions in accordance with a specification entry by the user, and stores the same in the data storage unit 13. In addition, the exercise condition acquiring unit 11 acquires information on the weight and the length of stride of the user in accordance with a specification entry by the user, and stores the same in a predetermined buffer.

In other words, the exercise condition acquiring unit 11 is means for acquiring information at least on the walking time, calorie consumption, walking speed, and distance as exercise conditions and storing the same in storage unit (namely, the data storage unit 13). The walking time indicates a period of time over which the user walks, the calorie consumption the calories consumed by the user, the number of steps the number of steps taken by the user, the walking speed the walking speed of the user, and the distance the distance walked by the user. According to an embodiment of the walking exercise supporting device disclosed herein, in accordance with a specification entry by the user, the exercise condition acquiring unit 11 acquires information on priorities of the respective exercise conditions (that is, information on walking time, calorie consumption, number of steps, walking speed, and distance). A priority is information indicating an order of precedence of exercise conditions to be used as search criteria by the route searching unit 14, to be described later, when searching for a walking route that is consistent with the exercise conditions. In addition, a priority is information indicating an order of precedence of exercise conditions to be used to determine a walking route search range by the route searching unit 14 when discrepancies arise in the relationships between the respective exercise conditions.

The exercise condition acquiring unit 11 also stores exercise conditions in the data storage unit 13, and subsequently presents the exercise conditions to the walking start point/walking end point acquiring unit 12.

The walking start point/walking end point acquiring unit 12 acquires position information on a walking start point and a walking end point in accordance with a specification entry by the user, and stores the same in the data storage unit 13. A walking start point is a point where the user starts walking and a walking end point is a point where the user stops walking. In other words, the walking start point/walking end point acquiring unit 12 is means for acquiring position information on a walking start point and a walking end point and storing the same in storage unit (namely, data storage unit 13).

In addition, after storing the position information on the walking start point and the walking end point in the data storage unit 13, the walking start point/walking end point acquiring unit 12 presents the same to the route searching unit 14.

The data storage unit 13 stores information on the exercise conditions acquired by the exercise condition acquiring unit 11 and position information on the walking start point and the walking end point acquired by the walking start point/walking end point acquiring unit 12. Specifically, information on the exercise conditions is stored in a search condition data table inside the data storage unit 13. According to another embodiment of the walking exercise supporting device, information on priorities of the respective exercise conditions is further stored in the search condition data table inside the data storage unit 13. In addition, map information including information on latitude and longitude is also previously stored in the data storage unit 13. Furthermore, for example, an exercise intensity calculating table such as that illustrated in FIG. 2 is previously stored in the data storage unit 13. Correspondence information between walking speeds and exercise intensities (METs) is set in the exercise intensity calculating table.

The route searching unit 14 searches for a walking route based on the exercise condition, the position information on the walking start point, the position information on the walking end point, and the map information stored in the data storage unit 13, and presents a search result to the presenting unit 15.

Specifically, the route searching unit 14 extracts a distance, position information on a walking start point, and position information on a walking end point from the data storage unit 13, and determines a walking route search range based on the extracted distance, position information on the walking start point, position information on the walking end point, and map information previously stored in the data storage unit 13.

The route searching unit 14 then searches for and determines a walking route that is consistent with exercise conditions stored in the data storage unit 13 among walking routes within the determined walking route search range, and assumes the determined walking route to be the search result. In other words, the route searching unit 14 is means for searching and determining a walking route to be presented to the user based on the exercise condition, the position information on the walking start point and the walking end point stored in the data storage unit 13, and the map information previously stored in the data storage unit 13.

According to another embodiment of the walking exercise supporting device, the route searching unit 14 may be arranged to reference priorities of the respective exercise conditions stored in the search condition data table when searching for a walking route that is consistent with the exercise conditions, and search for the walking route using the exercise conditions in a descending order of priorities as search criteria.

The presenting unit 15 presents the walking route determined by the route searching unit 14 by, for example, displaying the same on a screen. In other words, the presenting unit 15 is means for presenting the walking route determined by the walking route searching unit (namely, the route searching unit 14) to the user.

FIG. 3 is a diagram illustrating an example of a search condition data table. The search condition data table stores exercise conditions such as a walking time, calorie consumption, number of steps, walking speed, and distance, and a start position (that is, the position of a walking start point) and an end position (that is, the position of a walking end point). Reference characters d, m, s, N, and E set in the start position and end position fields respectively represent degrees, minutes, seconds, north latitude, and east longitude. In the example illustrated in FIG. 3, a priority is set for each exercise condition.

Figure 4:
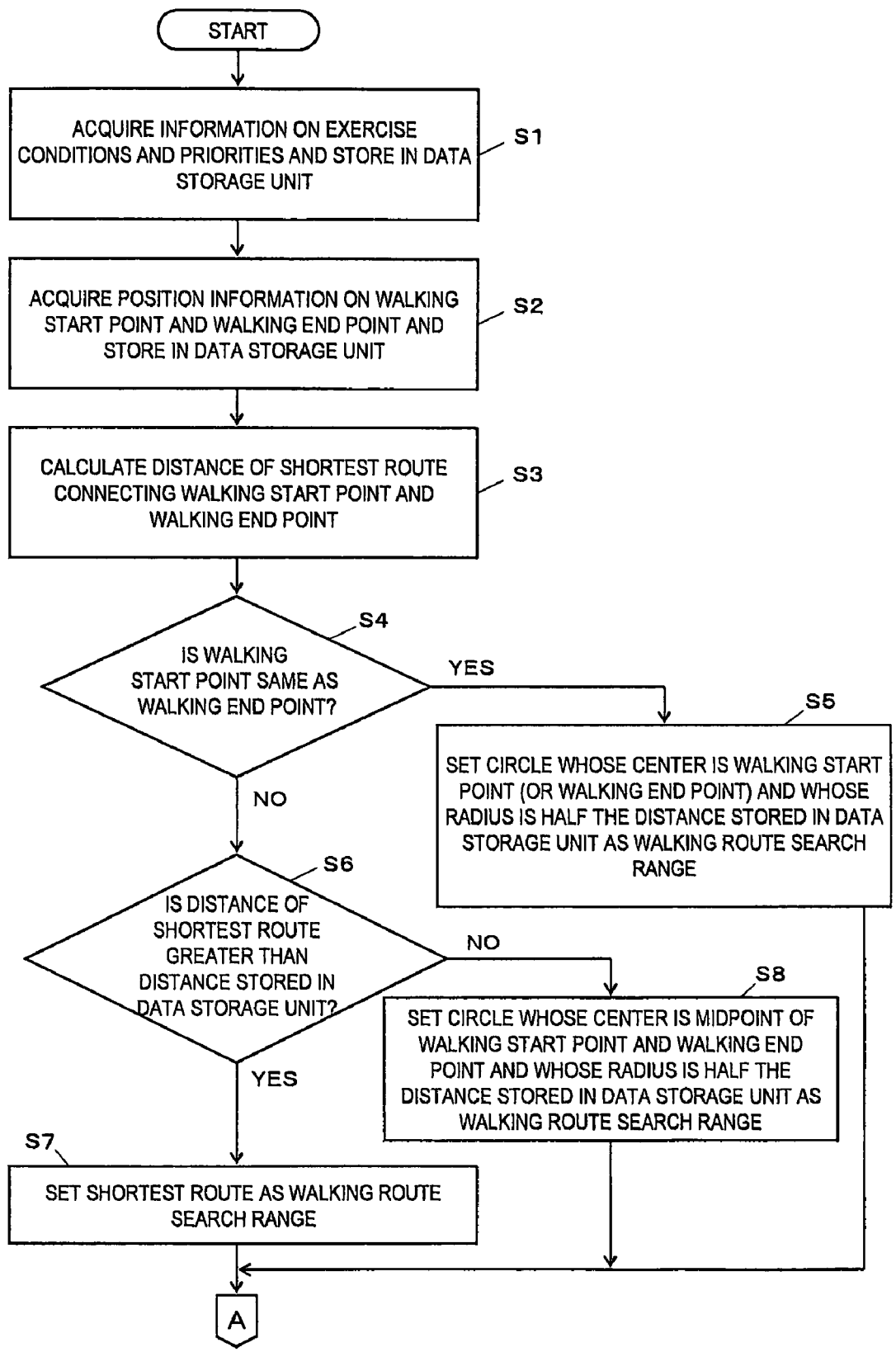
FIG. 4 is a diagram illustrating an example of a determination processing flow of a walking route according to the first embodiment of the walking exercise supporting device disclosed herein.
Figure 5:
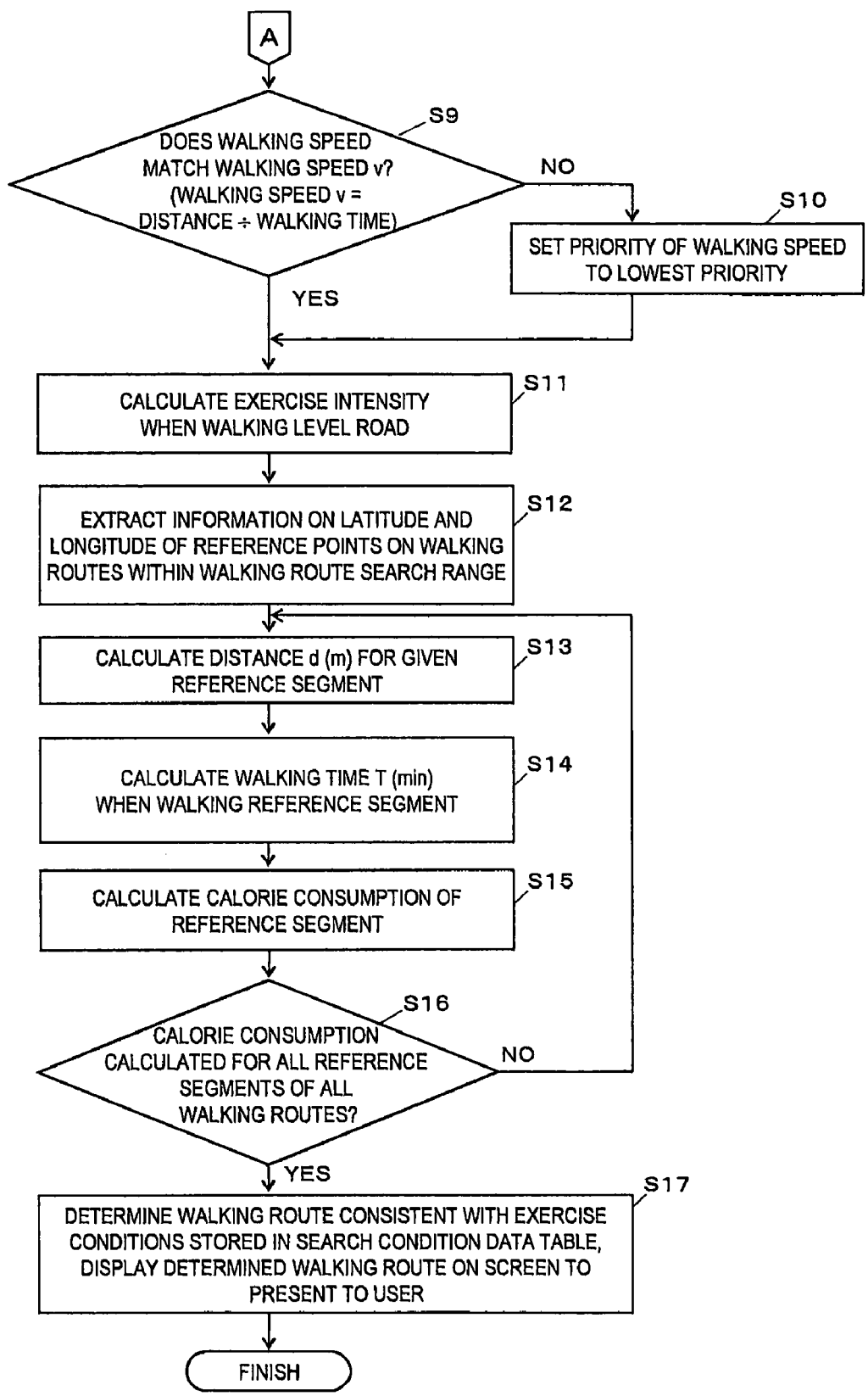
FIG. 5 is a diagram illustrating an example of a determination processing flow of a walking route according to the first embodiment of the walking exercise supporting device disclosed herein.

FIG. 4 and FIG. 5 are diagrams illustrating walking route determination processing flows according to the first embodiment of the walking exercise supporting device disclosed herein. First, in step S1 illustrated in FIG. 4, the exercise condition acquiring unit 11 acquires information on exercise conditions and priorities, and stores the same in the data storage unit 13 (step S1). In step S1, the exercise condition acquiring unit 11 further acquires information on the weight and the length of stride of the user, and stores the same in a predetermined buffer.

Next, the walking start point/walking end point acquiring unit 12 acquires position information on a walking start point and a walking end point, and stores the same in the data storage unit 13 (step S2).

Next, the route searching unit 14 acquires a distance and position information on a walking start point and a walking end point from the data storage unit 13, and calculates a distance of a shortest route connecting the walking start point and the walking end point based on the acquired position information on the walking start point and the walking end point and map information stored in the data storage unit 13 (step S3).

The route searching unit 14 judges whether the walking start point and the walking end point are the same (step S4). When the route searching unit 14 judges that the walking start point and the walking end point are the same, the route searching unit 14 sets a circle whose center is the walking start point (or the walking end point) and whose radius is half the distance stored in the data storage unit 13 as the walking route search range (step S5). The distance stored in the data storage unit 13 is the distance included in the exercise conditions acquired in step S1. Moreover, in step S5, when the priority of the number of steps is higher than the priority of the distance stored in the data storage unit 13, a value obtained by multiplying the length of stride of the user stored in the predetermined buffer by the number of steps may be arranged to be used in place of the distance stored in the data storage unit 13 (and, this similarly applies to step S6, step S8, and step S9 described below).

When the route searching unit 14 judges that the walking start point and the walking end point are not the same, the route searching unit 14 judges whether the distance of the shortest route calculated in step S3 is greater than the distance stored in the data storage unit 13 (step S6).

When the route searching unit 14 judges that the distance of the shortest route is not greater than the distance stored in the data storage unit 13, the route searching unit 14 sets a circle whose center is the midpoint of the walking start point and the walking end point and whose radius is half the distance stored in the data storage unit 13 as the walking route search range (step S8).

When the route searching unit 14 judges that the distance of the shortest route is greater than the distance stored in the data storage unit 13, the route searching unit 14 sets the shortest route connecting the walking start point and the walking end point as the walking route search range (step S7).

Next, in step S9 illustrated in FIG. 5, the route searching unit 14 judges whether the walking speed (m/min) stored in the data storage unit 13 matches a speed v calculated using a calculating formula expressed as "a speed v=the distance (m) stored in the data storage unit 13÷the walking time (min) stored in the data storage unit 13" (step S9).

When the route searching unit 14 judges that the walking speed stored in the data storage unit 13 does not match the speed v calculated using the calculating formula expressed as "distance÷walking time" representing dividing the distance by walking time, the route searching unit 14 sets the priority of the walking speed stored in the search condition data table in the data storage unit 13 to a lowest priority (step S10).

Next, the route searching unit 14 calculates an exercise intensity when walking a level road based on the speed v (walking speed) calculated using the calculating formula expressed as "distance÷walking time" and an exercise intensity calculating table previously stored in the data storage unit 13 (step S11). For example, the route searching unit 14 references the exercise intensity calculating table illustrated in FIG. 2 and sets the exercise intensities "METs" corresponding to the speed v as an exercise intensity during walking a level road.

Next, the route searching unit 14 extracts information on the latitude and longitude of reference points on walking routes within the walking route search range from the map information (step S12). The reference points are route branches in the walking routes as well as points per predetermined distance intervals along the walking routes. In the embodiments of the present invention, a segment between a reference point and a nearest reference point thereof shall be referred to as a reference segment.

Next, the route searching unit 14 calculates a distance d (m) of a reference segment based on the information on the latitude and longitude of the reference points (step S13). In addition, the route searching unit 14 calculates a walking time T (min) during walking the reference segment by dividing the distance d by the speed v (step S14). Next, the route searching unit 14 calculates calorie consumption with respect to the reference segment (step S15). The calorie consumption for a reference segment is the calorie consumption by the user when walking the reference segment.

Calorie consumption is calculated using the following calculating formula.

$$\text{Calorie consumption (kcal)} = METs \times O \times W \times C \times T \quad \text{Expression 1,}$$

where METs represents exercise intensity, O represents oxygen consumption at rest (e.g., 3.5 (ml/kg·min)), W represents the weight (kg) of the user, C represents a calorific value on consumption of 1 (ml) of oxygen (e.g., 0.005 (kcal/ml), and T represents walking time (min).

Specifically, in step S15, the route searching unit 14 calculates the calorie consumption for the reference segment according to Expression 1 above based on the exercise intensity calculated in step S11, a preset oxygen consumption at rest and a calorific value on consumption of 1 (ml) of oxygen, the weight of the user stored in a predetermined buffer, and the walking time T calculated in step S14.

Next, the route searching unit 14 judges whether calorie consumption has been calculated for all reference segments of all walking routes within the search range (step S16).

When the route searching unit 14 judges that there is a walking route or a reference segment for which calorie consumption has not been calculated, the flow returns to step S13.

When the route searching unit 14 judges that calorie consumption has been calculated for all reference points of all walking routes within the search range, the route searching unit 14 then determines a walking route that is consistent with exercise conditions stored in the search condition data table in the data storage unit 13 among walking routes within the search range, and presents the determined walking route to the user through screen display (step S17).

Specifically, the route searching unit 14 determines a walking route as described below. For example, let us assume that the route searching unit 14 has aggregated calorie consumption for all walking route reference segments for each of the walking routes, and that an aggregate thereof is denoted as calorie consumption P corresponding to a walking route. Let us also assume that the route searching unit 14 has aggregated a distance d for all walking route reference segments for each of the walking routes, and that an aggregate thereof is denoted as a distance Q corresponding to a walking route. Let us further assume that the route searching unit 14 has aggregated a walking time T for all walking route reference segments for each of the walking routes, and that an aggregate thereof is denoted as a walking time R corresponding to a walking route.

In this case, the route searching unit 14 determines a walking route corresponding to a walking time R, calorie consumption P, and distance Q respectively consistent with the walking time, calorie consumption, and distance stored in the search condition data table among all walking routes as the walking route to be presented to the user. For example, the route searching unit 14 determines a walking route corresponding to a walking time R whose difference from the walking time stored in the search condition data table is within the range of a predetermined threshold, calorie consumption P whose difference from the calorie consumption stored in the search condition data table is within the range of a predetermined threshold, and a distance Q whose difference from the distance stored in the search condition data table is within the range of a predetermined threshold as the walking route to be presented to the user.

According to another embodiment of the walking exercise supporting device, the route searching unit 14 may be arranged to select a search criterion from the walking time, calorie consumption, and distance stored in the data storage unit 13 based on the priorities of the respective exercise conditions set in the search condition data table, and determine a walking route corresponding to a walking time R, calorie consumption P, or distance Q that is consistent with the selected search criterion as the walking route to be presented to the user.

For example, in the search condition data table illustrated in FIG. 3, priority 1 is set to walking time as an exercise condition, priority 2 is set to calorie consumption, priority 3 is set to distance, priority 4 is set to number of steps, and priority 5 is set to walking speed. Using exercise conditions in a descending order of priorities as search criteria for route searching, the route searching unit 14 determines a walking route that is consistent with the search criteria. For example, the route searching unit 14 first extracts a walking route corresponding to a walking time R that is consistent (e.g., closest to) the walking time stored in the search condition data table (60 min in the example illustrated in FIG. 3) from all of the walking routes. When there is only one extracted walking route, the route searching unit 14 determines the extracted walking route as the walking route to be presented to the user.

When there is a plurality of extracted walking routes, the route searching unit 14 extracts a walking route corresponding to calorie consumption P that is consistent (e.g., closest to) the calorie consumption stored in the search condition data table (300 kcal in the example illustrated in FIG. 3). When there is only one extracted walking route, the route searching unit 14 determines the extracted walking route as the walking route to be presented to the user.

The route searching unit 14 determines one walking route to be ultimately presented to the user according to the walking route determination method described above. Moreover, according to an embodiment of the walking exercise supporting device disclosed herein, the route searching unit 14 may be arranged to determine one or more predetermined number of walking routes as walking routes to be ultimately presented to the user.

Next, a second embodiment of the walking exercise supporting device disclosed herein will be described. The second embodiment according to the present invention has the same device configuration (the device configuration illustrated in FIG. 1) as the device configuration of the first embodiment according to the present invention. In the second embodiment according to the present invention, the exercise condition acquiring unit 11 included in the walking exercise supporting device 1 illustrated in FIG. 1 acquires information on a walking time, calorie consumption, number of steps, walking speed, distance, and a maximum gradient of a walking route as exercise conditions in accordance with a specification entry by the user, and stores the same in the data storage unit 13. In addition, the exercise condition acquiring unit 11 acquires information on the weight and the length of stride of the user in accordance with a specification entry by the user, and stores the same in a predetermined buffer. The exercise condition acquiring unit 11 may be arranged to acquire information on priorities of the respective exercise conditions (namely, information on walking time, calorie consumption, number of steps, walking speed, distance, and maximum gradient of a walking route) in accordance with a specification entry by the user.

The exercise condition acquiring unit 11 also stores exercise conditions in the data storage unit 13, and subsequently presents the exercise conditions to the walking start point/walking end point acquiring unit 12.

The walking start point/walking end point acquiring unit 12 acquires position information on a walking start point and a walking end point in accordance with a specification entry by the user, and stores the same in the data storage unit 13.

In addition, after storing the information on the walking start point and the walking end point in the data storage unit 13, the walking start point/walking end point acquiring unit 12 presents the same to the route searching unit 14.

The data storage unit 13 stores information on the exercise conditions acquired by the exercise condition acquiring unit 11 and position information on the walking start point and the walking end point acquired by the walking start point/walking end point acquiring unit 12. Specifically, information on the exercise conditions is stored in a search condition data table inside the data storage unit 13. According to another embodiment of the walking exercise supporting device, information on priorities of the respective exercise condition is further stored in the search condition data table inside the data storage unit 13. In addition, in the second embodiment of the walking exercise supporting device disclosed herein, the data storage unit 13 further previously stores map information including information on latitude and longitude, information on altitude and the like, as well as correspondence information between rising gradients and exercise intensity augmentation factors such as that illustrated in FIG. 6. An exercise intensity augmentation factor is a coefficient indicating the degree in which exercise intensity increases when walking a walking route having a corresponding gradient.

The route searching unit 14 searches for a walking route based on the exercise conditions, the position information on the walking start point, the position information on the walking end point, and the map information stored in the data storage unit 13, and presents a search result to the presenting unit 15.

Specifically, the route searching unit 14 extracts a distance, position information on a walking start point, and position information on a walking end point from the data storage unit 13, and determines a walking route search range based on the extracted distance, position information on the walking start point, position information on the walking end point, and map information previously stored in the data storage unit 13.

The route searching unit 14 then searches for and determines a walking route that is consistent with exercise conditions stored in the search condition data table in the data storage unit 13 among walking routes within the determined walking route search range, and assumes the determined walking route to be the search result. According to another embodiment of the walking exercise supporting device, the route searching unit 14 may be arranged to reference priorities of the respective exercise conditions stored in the search condition data table when searching for a walking route that is consistent with the exercise conditions, and search for the walking route using the exercise conditions in a descending order of priorities as search criteria.

The presenting unit 15 presents the walking route determined by the route searching unit by, for example, displaying the same on a screen.

FIG. 7 is a diagram illustrating an example of a search condition data table. The search condition data table stores exercise conditions such as a walking time, calorie consumption, number of steps, walking speed, distance, and gradient (the size of the maximum gradient of a walking route), as well as a start position (the position of a walking start point) and an end position (the position of a walking end point). In the example illustrated in FIG. 7, a priority is set for each exercise condition.

Figure 8:
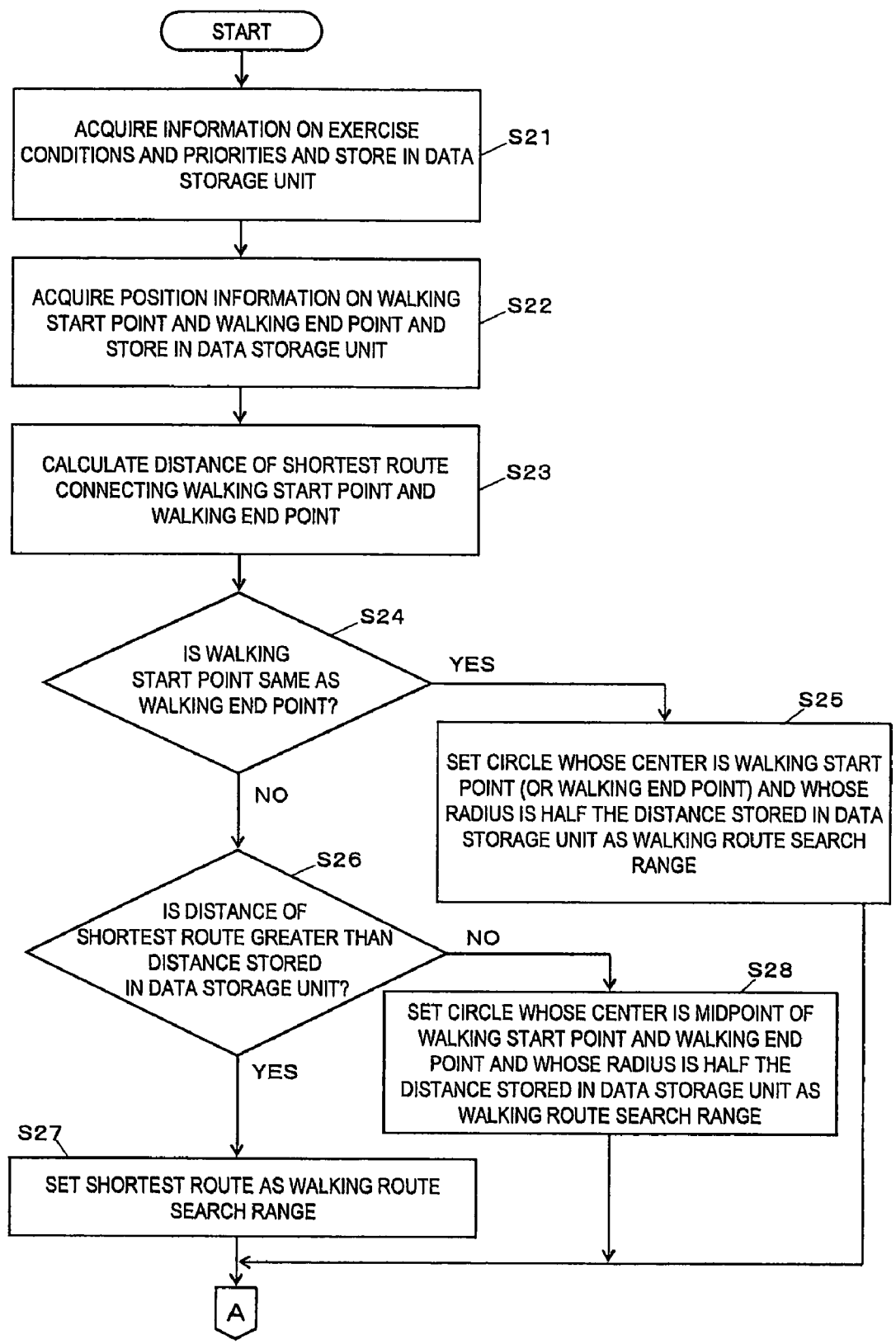
FIG. 8 is a diagram illustrating an example of a walking route searching processing flow according to a second embodiment of the walking exercise supporting device disclosed herein.
Figure 9:
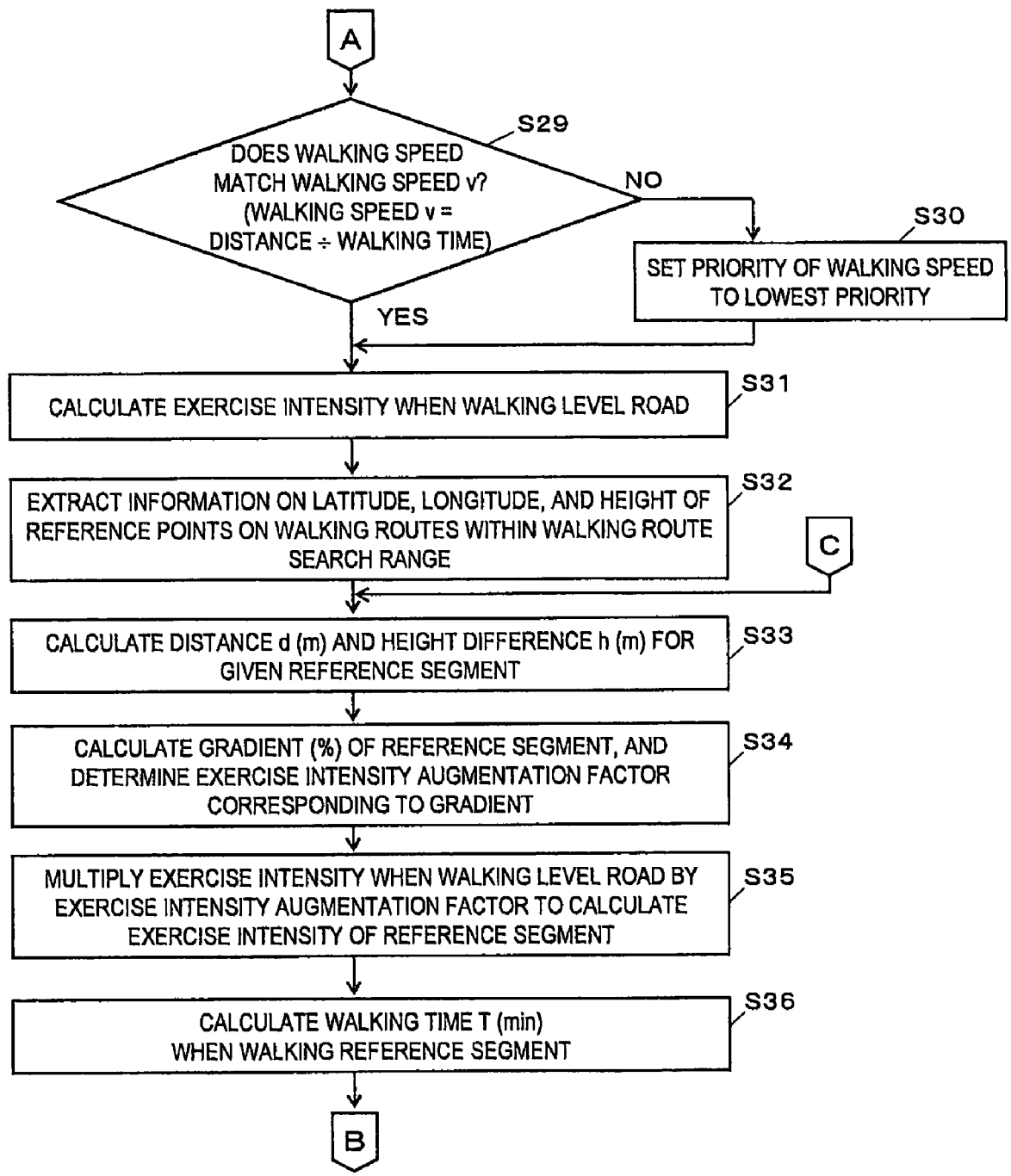
FIG. 9 is a diagram illustrating an example of a walking route searching processing flow according to the second embodiment of the walking exercise supporting device disclosed herein.
Figure 10:
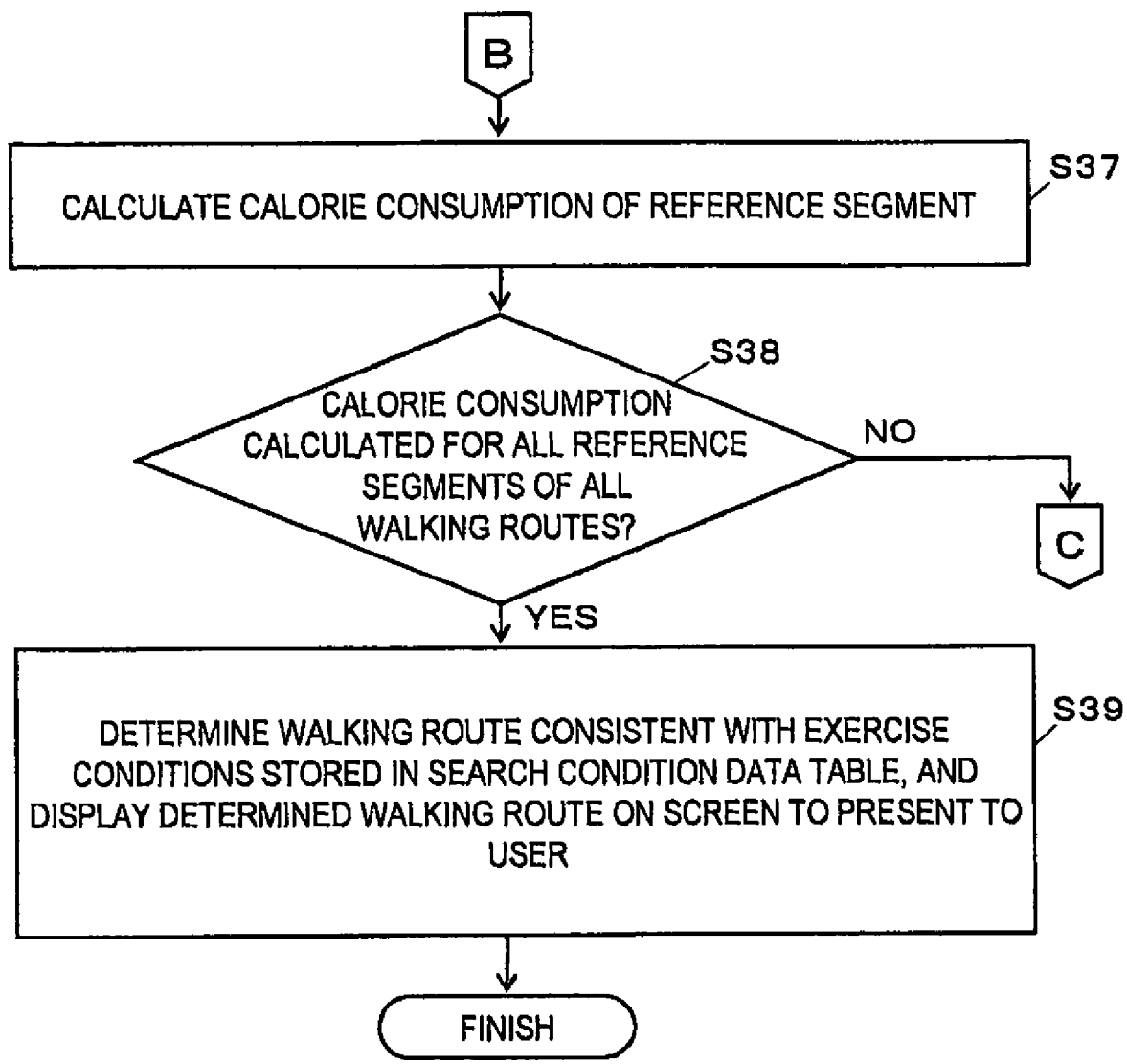
FIG. 10 is a diagram illustrating an example of a walking route searching processing flow according to the second embodiment of the walking exercise supporting device disclosed herein.

FIG. 8 to FIG. 10 are diagrams illustrating walking route searching processing flows according to the second embodiment of the walking exercise supporting device disclosed herein. First, in step S21 illustrated in FIG. 8, the exercise condition acquiring unit 11 acquires information on exercise conditions and priorities, and stores the same in the data storage unit 13 (step S21). In step S21, the exercise condition acquiring unit 11 further acquires information on the weight and the length of stride of the user, and stores the same in a predetermined buffer.

Next, the walking start point/walking end point acquiring unit 12 acquires position information on a walking start point and a walking end point, and stores the same in the data storage unit 13 (step S22).

Next, the route searching unit 14 acquires a distance and position information on a walking start point and a walking end point from the data storage unit 13, and calculates a distance of a shortest route connecting the walking start point and the walking end point based on the acquired position information on the walking start point and the walking end point and map information stored in the data storage unit 13 (step S23).

The route searching unit 14 judges whether the walking start point and the walking end point are the same (step S24). When the route searching unit 14 judges that the walking start point and the walking end point are the same, the route searching unit 14 sets a circle whose center is the walking start point (or the walking end point) and whose radius is half the distance stored in the data storage unit 13 as the walking route search range (step S25). The distance stored in the data storage unit 13 is the distance included in the exercise conditions acquired in step S21. Moreover, in step S25, when the priority of the number of steps is higher than the priority of the distance stored in the data storage unit 13, a value obtained by multiplying the length of stride of the user stored in the predetermined buffer by the number of steps may be arranged to be used in place of the distance stored in the data storage unit 13 (and this similarly applies to step S26, step S28, and step S29 described below).

When the route searching unit 14 judges that the walking start point and the walking end point are not the same, the route searching unit 14 judges whether the distance of the shortest route calculated in step S23 is greater than the distance stored in the data storage unit 13 (step S26).

When the route searching unit 14 judges that the distance of the shortest route is not greater than the distance stored in the data storage unit 13, the route searching unit 14 sets a circle whose center is the midpoint of the walking start point and the walking end point and whose radius is half the distance stored in the data storage unit 13 as the walking route search range (step S28).

When the route searching unit 14 judges that the distance of the shortest route is greater than the distance stored in the data storage unit 13, the route searching unit 14 sets the shortest route connecting the walking start point and the walking end point as the walking route search range (step S27).

Next, in step S29 illustrated in FIG. 9, the route searching unit 14 judges whether the walking speed (m/min) stored in the data storage unit 13 matches a speed v calculated using a calculating formula expressed as "a speed v=the distance (m) stored in the data storage unit 13÷the walking time (min) stored in the data storage unit 13" (step S29).

When the route searching unit 14 judges that the walking speed (m/min) stored in the data storage unit 13 does not match the speed v calculated using the calculating formula expressed as "distance÷walking time", the route searching unit 14 sets the priority of walking speed stored in the search condition data table in the data storage unit 13 to a lowest priority (step S30).

Next, the route searching unit 14 calculates an exercise intensity when walking a level road based on the speed v (walking speed) calculated using the calculating formula expressed as "distance÷walking time" and the exercise intensity calculating table by referencing FIG. 2 (step S31).

Next, the route searching unit 14 extracts information on the latitude, longitude, and height (altitude) of reference points on walking routes within the walking route search range from the map information (step S32).

Next, the route searching unit 14 calculates a distance d (m) of a reference segment based on the information on the latitude and longitude of the reference points, and based on information on the heights of the reference points, calculates a height difference h (m) of the reference segment (step S33).

The route searching unit 14 calculates a gradient (%) of the reference segment according to a calculating formula expressed as "gradient (%)=h÷d×100", and based on the calculated gradient and correspondence information between rising gradients and exercise intensity augmentation factors such as that illustrated in FIG. 6 described earlier, determines an exercise intensity augmentation factor corresponding to the calculated gradient (step S34).

Next, the route searching unit 14 multiplies the exercise intensity when walking a level road calculated in step S31 by the exercise intensity augmentation factor determined in step S34 to calculate an exercise intensity for the reference segment (step S35). In addition, the route searching unit 14 calculates a walking time T (min) when walking the reference segment by dividing the distance d by the speed v (step S36).

Next, in step S37 illustrated in FIG. 10, the route searching unit 14 calculates calorie consumption with respect to the reference segment (step S37). Specifically, the route searching unit 14 calculates the calorie consumption for the reference segment according to Expression 1 above based on the exercise intensity calculated in step S35, a preset oxygen consumption at rest and a calorific value on consumption of 1 (ml) of oxygen, the weight of the user stored in the predetermined buffer, and the walking time T calculated in step S36.

Next, the route searching unit 14 judges whether calorie consumption has been calculated for all reference segments of all walking routes within the search range (step S38).

When the route searching unit 14 judges that there is a walking route or a reference segment for which calorie consumption has not been calculated, the flow returns to step S33 illustrated in FIG. 9.

When the route searching unit 14 judges that calorie consumption has been calculated for all reference points of all walking routes within the search range, the route searching unit 14 then determines a walking route that is consistent with exercise conditions stored in the search condition data table in the data storage unit 13 among walking routes within the search range, and presents the determined walking route to the user by displaying the same on a screen (step S39).

Specifically, the route searching unit 14 determines a walking route as described below. For example, let us assume that the route searching unit 14 has aggregated calorie consumption for all walking route reference segments for each of the walking routes, and that the aggregate is denoted as calorie consumption P corresponding to a walking route. Let us also assume that the route searching unit 14 has determined a maximum gradient among the gradients of all walking route reference segments for each of the walking routes, and that the determined gradient is denoted as a maximum gradient S corresponding to a walking route.

Let us also assume that the route searching unit 14 has aggregated a distance d for all walking route reference segments for each of the walking routes, and that the aggregate is denoted as a distance Q corresponding to a walking route. Let us further assume that the route searching unit 14 has aggregated a walking time T for all walking route reference segments for each of the walking routes, and that the aggregate is denoted as a walking time R corresponding to a walking route.

In this case, the route searching unit 14 determines a walking route corresponding to a walking time R, calorie consumption P, distance Q, and maximum gradient S respectively consistent with the walking time, calorie consumption, distance, and gradient stored in the search condition data table among all walking routes as the walking route to be presented to the user.

According to another embodiment of the walking exercise supporting device, the route searching unit 14 may be arranged to select a search criterion from the walking time, the calorie consumption, the distance, and the maximum gradient based on the priorities of the respective exercise conditions set in the search condition data table, and determine a walking route corresponding to a walking time R, calorie consumption P, a distance Q, or a maximum gradient S that is consistent with the selected search criterion as the walking route to be presented to the user.

For example, in the search condition data table illustrated in FIG. 7, priority 1 is set to walking time as an exercise condition, priority 2 is set to calorie consumption, priority 3 is set to gradient, priority 4 is set to distance, priority 5 is set to walking speed, and priority 6 is set to number of steps. Using exercise conditions in a descending order of priorities as search criteria for route searching, the route searching unit 14 determines a walking route that is consistent with the search criteria. For example, the route searching unit 14 first extracts a walking route corresponding to a walking time R that is consistent (e.g., closest to) the walking time stored in the search condition data table (60 min in the example illustrated in FIG. 7) from all of the walking routes. When there is only one extracted walking route, the route searching unit 14 determines the extracted walking route as the walking route to be presented to the user.

When there is a plurality of extracted walking routes, the route searching unit 14 extracts a walking route corresponding to calorie consumption P that is consistent (e.g., closest to) the calorie consumption stored in the search condition data table (300 kcal in the example illustrated in FIG. 7). When there is only one extracted walking route, the route searching unit 14 determines the extracted walking route as the walking route to be presented to the user. When there is a plurality of extracted walking routes, the route searching unit 14 extracts a walking route corresponding to a maximum gradient S that is consistent (e.g., closest to) the gradient stored in the search condition data table (10% in the example illustrated in FIG. 7). When there is only one extracted walking route, the route searching unit 14 determines the extracted walking route as the walking route to be presented to the user.

The route searching unit 14 determines one walking route to be ultimately presented to the user according to the walking route determination method. Moreover, the route searching unit 14 may be arranged to determine one or more predetermined number of walking routes as the walking route to be ultimately presented to the user.

Figure 11:
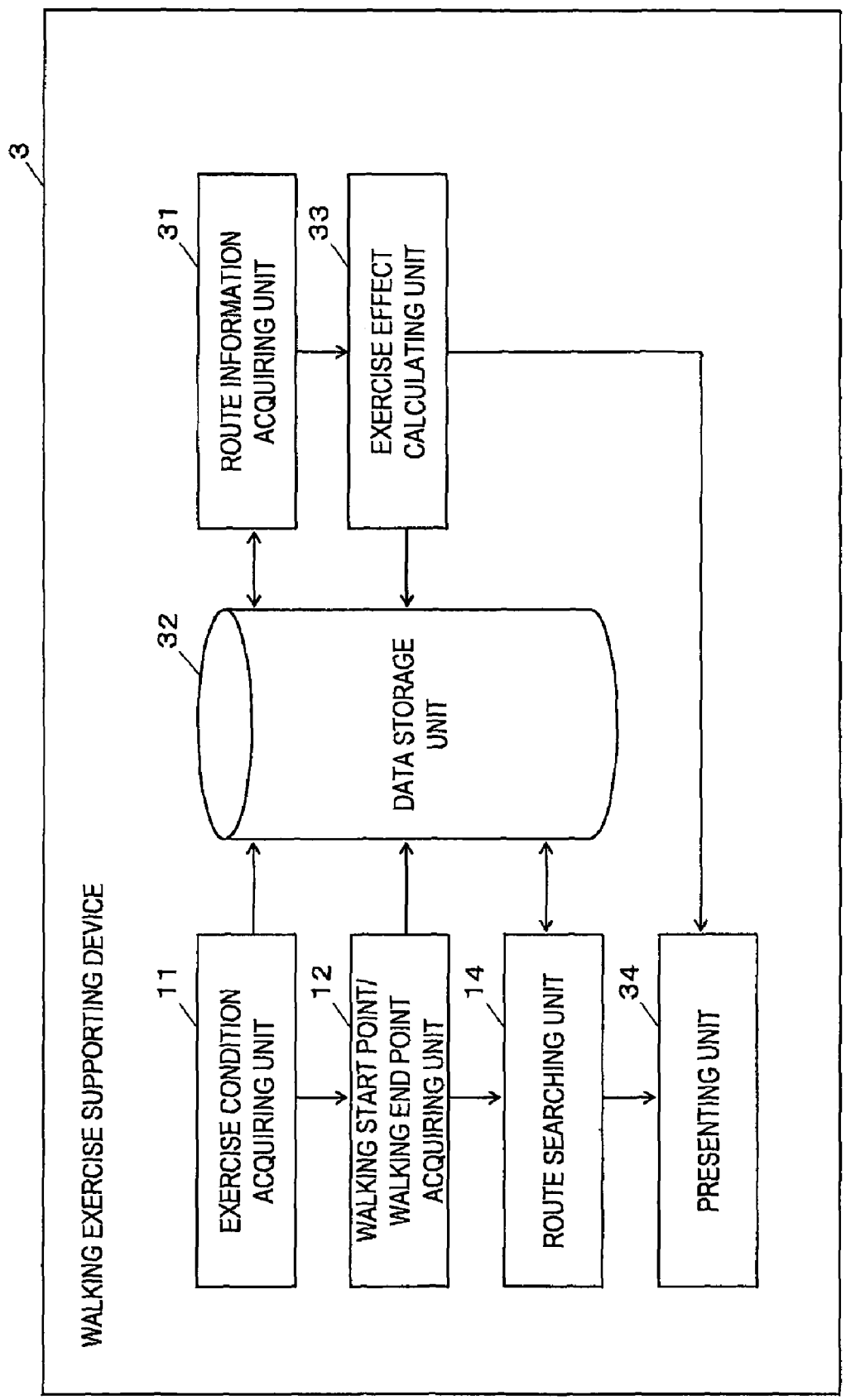
FIG. 11 is a diagram illustrating a device configuration example according to a third embodiment of the walking exercise supporting device disclosed herein.

Next, a third embodiment of the walking exercise supporting device disclosed herein will be described. FIG. 11 is a diagram illustrating a device configuration example of the third embodiment of the walking exercise supporting device disclosed herein. A walking exercise supporting device 3 is a processing device for supporting a walking exercise of a user. The walking exercise supporting device 3 is, for example, a terminal device such as a mobile telephone. The walking exercise supporting device 3 includes an exercise condition acquiring unit 11, a walking start point/walking end point acquiring unit 12, a route searching unit 14, a route information acquiring unit 31, a data storage unit 32, an exercise effect calculating unit 33, and a presenting unit 34. Among the components included in the walking exercise supporting device 3 illustrated in FIG. 11, components assigned the same reference numerals as the walking exercise supporting device 1 illustrated in FIG. 1 (in other words, the walking exercise supporting device according to the first embodiment of the walking exercise supporting device disclosed herein or the second embodiment of the walking exercise supporting device disclosed herein) are equipped with the same functions as the components included in the walking exercise supporting device 1, and a detailed description thereof will be omitted herein.

The route information acquiring unit 31 acquires information on a walking route from a walking start point to a walking end point in accordance with a specification entry by the user. In addition, the route information acquiring unit 31 extracts information on the latitude, longitude, and height of the reference points on the entered walking route from map information previously stored in the data storage unit 32, associates the extracted information (route information on the reference points) with position IDs, and stores the same in a route information data table, to be described later, in the data storage unit 32. A position ID is identification information that uniquely identifies a reference point and a record (one line's worth of data) in the route information data table.

In addition, the route information acquiring unit 31 calculates a height difference and a distance between the respective position IDs, associates the same with the respective position IDs, and stores the same in the route information data table. A height difference between respective position IDs is the difference between the height of a reference point and the height of an immediately previous reference point. A distance between respective position IDs is the difference between a position determined from latitude and longitude information on a reference point and a position determined from latitude and longitude information on an immediately previous reference point.

Furthermore, route information acquiring unit 31 calculates a gradient for each position ID based on the height difference and the distance between the respective position IDs, and stores the same in the route information data table. A gradient of a position ID is the gradient of a segment (reference segment) between a reference point corresponding to the position ID and a reference point immediately previous thereto.

In other words, the route information acquiring unit 31 is means for acquiring information on a walking route from a walking start point to a walking end point, extracting information on the latitude, longitude, and height of each reference point on the entered walking route from map information previously stored in the data storage unit 32, and storing the same in the data storage unit 32.

The data storage unit 32 stores, in addition to information stored in the data storage unit 13 (as referred to FIG. 1), (for example, information on exercise conditions, position information on a walking start point and a walking end point, information on the priority of each exercise condition, map information, correspondence information between rising gradients and exercise intensity augmentation factors, and an exercise intensity calculating table), a route information data table such as that illustrated in FIG. 12. Moreover, the map information includes, for example, latitude and longitude information, altitude information, or the like.

The route information data table illustrated in FIG. 12 is made up of data items such as a position ID, latitude and longitude, height (m), distance (m), height difference (m), and gradient (%). As described earlier, a position ID is identification information that uniquely identifies a reference point and a record (one line's worth of data) in the route information data table. Latitude and longitude are information on the latitude and longitude of a reference point corresponding to the position ID. A height (m) is information on the height of the reference point corresponding to the position ID. A distance (m) is the distance between a position of the reference point corresponding to the position ID and a position of a reference point immediately previous thereto (in other words, the distance of a reference segment between the reference point corresponding to the position ID and a reference point immediately previous thereto). A height difference (m) is the difference between the height of the reference point corresponding to the position ID and the height of a reference point immediately previous thereto. As described earlier, a gradient (%) is the gradient of a reference segment between the reference point corresponding to the position ID and a reference point immediately previous thereto. The gradient (%) is calculated by dividing the height difference (m) by the distance (m), and multiplying the result thereof by 100.

The exercise effect calculating unit 33 calculates a user's calorie consumption per walking speed on a walking route acquired by the route information acquiring unit 31.

Specifically, the exercise effect calculating unit 33 references the route information data table, and determines an exercise intensity augmentation factor corresponding to each position ID based on information on a gradient corresponding to each position ID, and correspondence information between rising gradients and exercise intensity augmentation factors previously stored in the data storage unit 32. An exercise intensity augmentation factor corresponding to each position ID is the exercise intensity augmentation factor regarding a reference segment between the reference point corresponding to the position ID and a reference point immediately previous thereto.

The exercise effect calculating unit 33 then varies the walking speed v' (m/min) at predetermined intervals, and calculates an exercise intensity when walking a level road for each walking speed. For example, based on the value of a default walking speed and the exercise intensity calculating table described earlier with reference to FIG. 2, the exercise effect calculating unit 33 calculates an exercise intensity when walking a level road at the walking speed. The exercise effect calculating unit 33 then calculates an exercise intensity when walking a level road for each of a plurality of walking speeds obtained by varying the value of the default walking speed by, for example, 10 (m/min) increments.

Next, the exercise effect calculating unit 33 multiplies the calculated per-walking speed exercise intensities during walking a level road by the calculated exercise intensity augmentation factor for each reference segment to calculate an exercise intensity of each reference segment for each walking speed v'.

In addition, the exercise effect calculating unit 33 calculates a walking time T (min) during walking each reference segment for each walking speed v' by dividing the distance (m) of each reference segment by the walking speed v'.

The exercise effect calculating unit 33 calculates calorie consumption of each reference segment for each walking speed v' according to Expression 1 based on the calculated exercise intensity for each reference segment, preset oxygen consumption at rest, the weight of the user, the calorific value on consumption of 1 (ml) of oxygen, and the calculated walking time T.

The exercise effect calculating unit 33 then aggregates calorie consumption for all reference segments, and calculates calorie consumption of the walking route for each walking speed v'.

In other words, the exercise effect calculating unit 33 is means for calculating gradients between respective reference points based on information on the latitude, longitude, and height of the respective reference points stored in the data storage unit 32, and based on the calculated gradients between respective reference points and respective walking speeds obtained by varying a value of a preset walking speed, calculating calorie consumption when the user walks a walking route entered by the route information acquiring unit 31 for each of the walking speeds.

According to another embodiment of the walking exercise supporting device, the exercise effect calculating unit 33 may be arranged to calculate calorie consumption per required walking time when walking from the walking start point to the walking end point of the walking route for each required walking time. Specifically, the exercise effect calculating unit 33 may be arranged to aggregate the calculated walking times T when walking the respective reference segments to calculate total walking times T' when walking the walking route, and calculate a user's calorie consumption for each of the calculated total walking times T'.

In addition to being equipped with similar functions to the presenting unit 15 described earlier with reference to FIG. 1, the presenting unit 34 presents calorie consumption with respect to a walking route for each walking speed v' calculated by the exercise effect calculating unit 33. According to another embodiment of the walking exercise supporting device, the presenting unit 34 may be arranged to present calorie consumption with respect to a walking route for each total walking time T' calculated by the exercise effect calculating unit 33 to the user.

Figure 13:
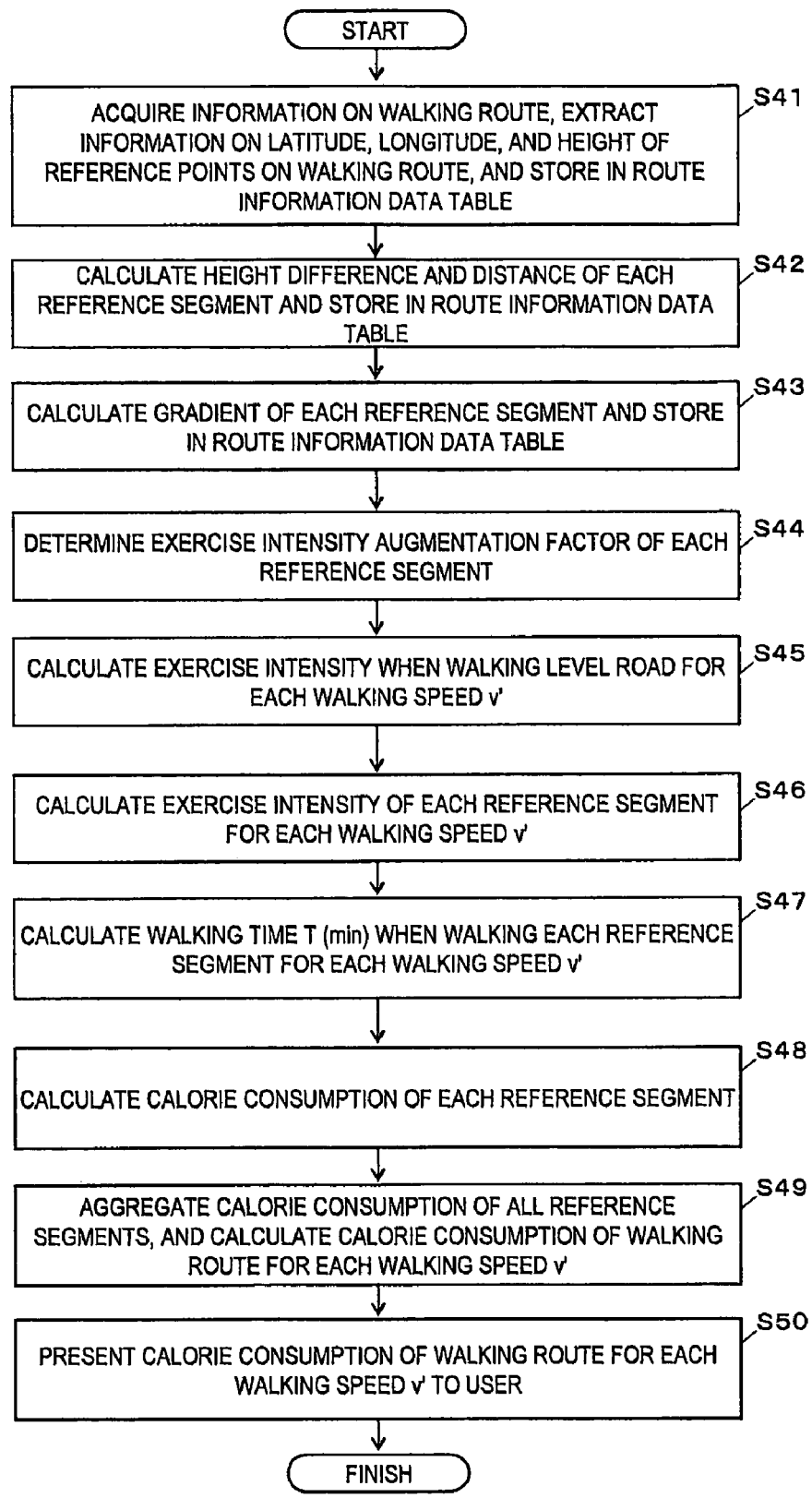
FIG. 13 is a diagram illustrating an example of calorie consumption presentation flow according to the third embodiment of the walking exercise supporting device disclosed herein.

FIG. 13 is a diagram illustrating an example of calorie consumption presentation processing flow according to the third embodiment of the walking exercise supporting device disclosed herein. First, the route information acquiring unit 31 acquires information on a walking route, extracts information on the latitude, longitude, and height of the reference points on the walking route, and stores the same in the route information data table (step S41).

In addition, the route information acquiring unit 31 calculates a height difference and a distance between the respective reference segments, and stores the same in the route information data table (step S42).

Furthermore, the route information acquiring unit 31 calculates gradients of the respective reference segments, and stores the same in the route information data table (step S43).

Next, the exercise effect calculating unit 33 determines an exercise intensity augmentation factor of each reference segment based on information on the gradients of the respective segments and on correspondence information between rising gradients and exercise intensity augmentation factors previously stored in the data storage unit 32 (step S44).

The exercise effect calculating unit 33 then varies the walking speed v' (m/min) at predetermined intervals, and calculates an exercise intensity when walking a level road for each walking speed v' (step S45).

Next, the exercise effect calculating unit 33 multiplies the calculated exercise intensities per walking speed when walking a level road by the exercise intensity augmentation factor for each reference segment to calculate an exercise intensity of each reference segment for each walking speed v' (step S46). In addition, the exercise effect calculating unit 33 calculates a walking time T (min) when walking each reference segment for each walking speed v' by dividing the distance (m) of each reference segment by the walking speed v' (step S47).

Furthermore, the exercise effect calculating unit 33 calculates calorie consumption of each reference segment for each walking speed v' according to Expression 1 described above based on the calculated exercise intensity for each reference segment, preset oxygen consumption at rest and the calorific value on consumption of 1 (ml) of oxygen, the weight of the user entered by the exercise condition acquiring unit 11 and stored in a predetermined buffer, and the calculated walking time T (step S48).

The exercise effect calculating unit 33 then aggregates calorie consumption for all reference segments, and calculates calorie consumption of the walking route for each walking speed v' (step S49).

The presenting unit 34 presents the calculated calorie consumption of the walking route for each walking speed v' to the user (step S50).

Figure 14:
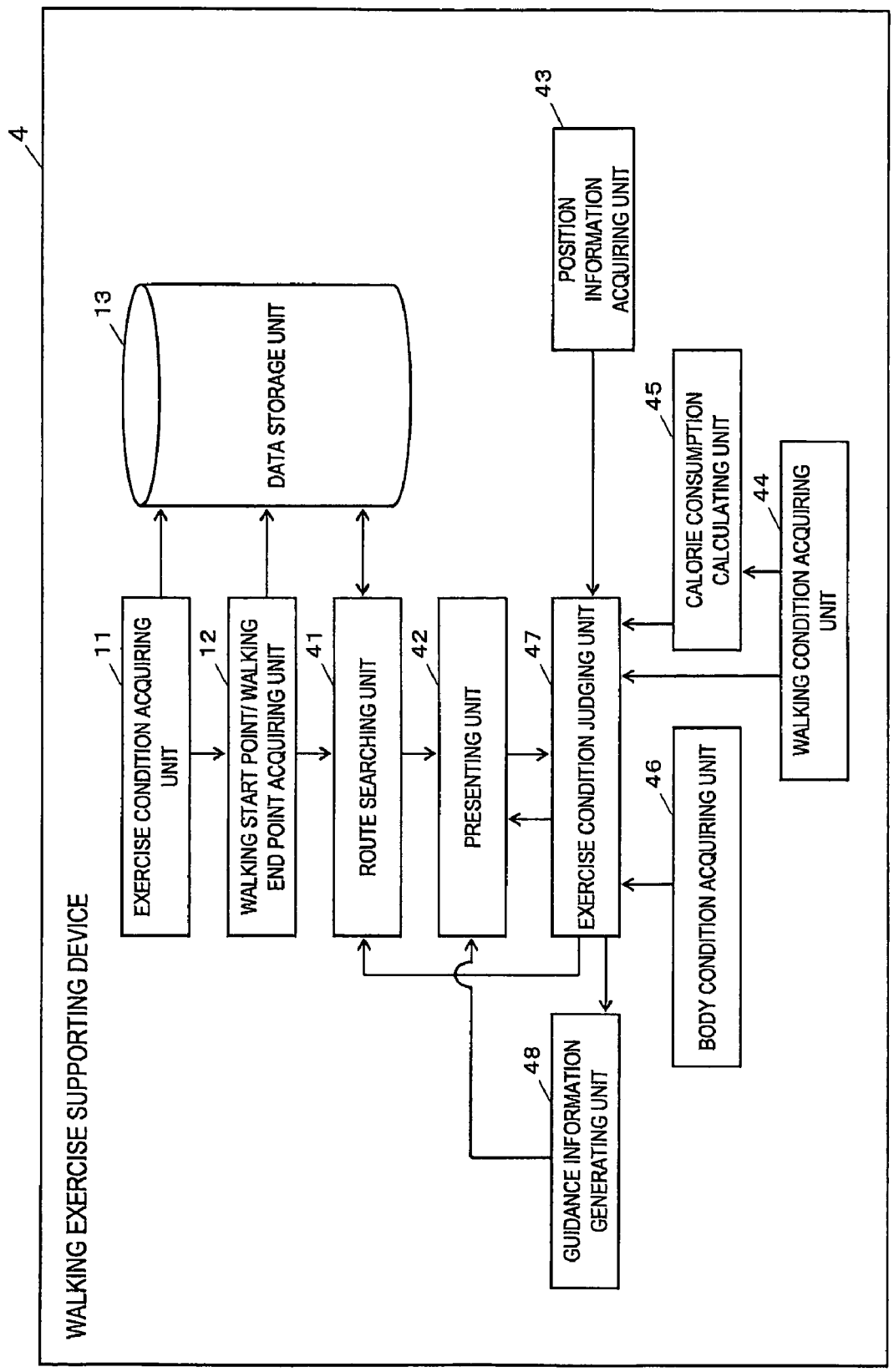
FIG. 14 is a diagram illustrating a device configuration example according to a fourth embodiment of the walking exercise supporting device disclosed herein.

Next, a fourth embodiment of the walking exercise supporting device disclosed herein will be described. FIG. 14 is a diagram illustrating a device configuration example of the fourth embodiment of the walking exercise supporting device disclosed herein. A walking exercise supporting device 4 is a processing device for supporting a walking exercise of a user. Moreover, in this example, the walking exercise supporting device 4 is, for example, a terminal device such as a mobile telephone carried around by the user when walking. The walking exercise supporting device 4 includes an exercise condition acquiring unit 11, a walking start point/walking end point acquiring unit 12, a data storage unit 13, a route searching unit 41, a presenting unit 42, position information acquiring unit 43, a walking condition acquiring unit 44, calorie consumption calculating unit 45, a body condition acquiring unit 46, an exercise condition judging unit 47, and a guidance information generating unit 48. Among the components included in the walking exercise supporting device 4 illustrated in FIG. 14, components assigned the same reference numerals as the walking exercise supporting device 1 illustrated in FIG. 1 (in other words, the walking exercise supporting device according to the first embodiment of the walking exercise supporting device disclosed herein or the second embodiment of the walking exercise supporting device disclosed herein) are equipped with the same functions as the components included in the walking exercise supporting device 1 and a detailed description thereof will be omitted herein.

As explained earlier in, for example, the description of the first embodiment according to the present invention, the data storage unit 13 stores information on the exercise conditions acquired by the exercise condition acquiring unit 11 and position information on the walking start point and the walking end point acquired by the walking start point/walking end point acquiring unit 12. Specifically, information on the exercise conditions is stored in a search condition data table, such as that described earlier and illustrated in FIG. 3, inside the data storage unit 13. According to an embodiment of the walking exercise supporting device disclosed herein, information on a priority of each exercise condition is further stored in the search condition data table. In addition, for example, map information including information on latitude and longitude is further previously stored in the data storage unit 13. Furthermore, for example, an exercise intensity calculating table such as that illustrated in FIG. 2 is previously stored in the data storage unit 13. In addition, as explained earlier in the description of the second embodiment according to the present invention, the data storage unit 13 may be arranged to further previously store correspondence information between rising gradients and exercise intensity augmentation factors such as that illustrated in FIG. 6.

The route searching unit 41 is equipped with the same functions as the route searching unit 14 described earlier with reference to FIG. 1. That is, the route searching unit 41 searches for a walking route based on the exercise conditions, the position information on the walking start point, the position information on the walking end point, and the map information stored in the data storage unit 13, and presents a search result to the presenting unit 42. In addition, the route searching unit 41 receives updated exercise conditions of the user from the exercise condition judging unit 47 to be described later, and based on the updated exercise conditions of the user, re-searches for a walking route.

The presenting unit 42 presents the walking route determined by the route searching unit 41 to the user. In addition, the presenting unit 42 presents guidance information received from the guidance information generating unit 48 to the user. Furthermore, the presenting unit 42 presents a judgment result of the exercise conditions of the user received from the exercise condition judging unit 47 to the user.

The position information acquiring unit 43 acquires position information X of the user walking a walking route presented by the presenting unit 42 from, for example, a GPS at each predetermined time interval. In addition, the position information acquiring unit 43 calculates a first walking speed Y of the walking user based on the predetermined time interval and the position information X, and transmits the position information X and information on the first walking speed Y to the exercise condition judging unit 47. In other words, the position information acquiring unit 43 is means for acquiring position information on a walking user per predetermined time intervals, and based on the acquired position information on the user per predetermined time intervals, calculating a walking speed of the walking user.

The walking condition acquiring unit acquires information on the number of steps I of the user as measured by a pedometer (not illustrated) built into the walking exercise supporting device 4 at predetermined time intervals. In addition, the walking condition acquiring unit 44 calculates a walking time J of the user based on information on the time intervals at which information on the number of steps I of the user is acquired. Furthermore, the walking condition acquiring unit 44 calculates a second walking speed Y' of the user based on the information on the length of stride of the user entered by the exercise condition acquiring unit 11 and stored in a predetermined buffer, and information on the calculated number of steps I and the walking time J of the user. The walking condition acquiring unit 44 then transmits information on the second walking speed Y' to the exercise condition judging unit 47. In addition, the walking condition acquiring unit 44 transmits information on the walking time J and the second walking speed Y' to the calorie consumption calculating unit 45.

The calorie consumption calculating unit 45 calculates an actual calorie consumption D of the user based on the walking time J and the second walking speed Y' received from the walking condition acquiring unit 44. Specifically, the calorie consumption calculating unit 45 calculates an exercise intensity corresponding to the second walking speed Y' based on an exercise intensity calculating table such as that illustrated in FIG. 2. The calorie consumption calculating unit 45 then calculates an actual calorie consumption D according to Expression 1 presented above based on the walking time J, the calculated exercise intensity, preset oxygen consumption at rest and the calorific value on consumption of 1 (ml) of oxygen, and the weight of the user entered by the exercise condition acquiring unit 11 and stored in a predetermined buffer. The calorie consumption calculating unit 45 transmits information on the calculated actual calorie consumption D to the exercise condition judging unit 47.

The body condition acquiring unit 46 acquires information on the body condition of the user as measured by a device (not illustrated in FIG. 14) such as a pulsimeter that measures a body condition (for example, a pulse rate) of a walking user. In other words, the body condition acquiring unit 46 is means for acquiring information on the body condition of a walking user. The body condition acquiring unit 46 transmits acquired information on the body condition of a user to the exercise condition judging unit 47.

The exercise condition judging unit 47 judges the exercise condition of the user, and transmits the judgment result to the guidance information generating unit 48 and the presenting unit 42. Exercise conditions of the user include a walking speed of the user, calorie consumption, a position of the user, and a body condition.

Specifically, the exercise condition judging unit 47 judges whether the position information X received from the position information acquiring unit 43 is consistent with the walking route determined by the route searching unit 41 (that is, whether the position of the user has not deviated from the walking route). The exercise condition judging unit 47 transmits the judgment result to the guidance information generating unit 48 and the presenting unit 42. In addition, the exercise condition judging unit 47 judges whether the first walking speed Y received from the position information acquiring unit 43 is consistent with the walking speed stored in the search condition data table, and transmits the judgment result to the guidance information generating unit 48 and the presenting unit 42. For example, the exercise condition judging unit 47 judges whether the difference between the first walking speed Y and the walking speed stored in the search condition data table exceeds a range of a predetermined threshold. In other words, the exercise condition judging unit 47 is means for judging whether the position information on a walking user is consistent with a walking route determined by the route searching unit 41, and for judging whether the walking speed of a walking user is consistent with the walking speed stored in the data storage unit 13 by the exercise condition acquiring unit 11.

In addition, the exercise condition judging unit 47 judges whether the second walking speed Y' received from the walking condition acquiring unit 44 is consistent with the walking speed stored in the search condition data table, and transmits the judgment result to the guidance information generating unit 48 and the presenting unit 42. For example, the exercise condition judging unit 47 judges whether the difference between the second walking speed Y' and the walking speed stored in the search condition data table exceeds a range of a predetermined threshold. Furthermore, the exercise condition judging unit 47 calculates a reference calorie consumption D' based on calorie consumption of each reference segment of a walking route along which the user is currently walking calculated when the walking route was searched, and on the position information X of the user. The reference calorie consumption D' is an aggregate of calorie consumption of all reference segments from the walking start point to the reference segment corresponding to the current position of the user. The exercise condition judging unit 47 then judges whether the actual calorie consumption D received from the calorie consumption calculating unit 45 is consistent with the reference calorie consumption D', and transmits the judgment result to the guidance information generating unit 48 and the presenting unit 42. For example, the exercise condition judging unit 47 judges whether the difference between the actual calorie consumption D and the reference calorie consumption D' exceeds a range of a predetermined threshold.

In addition, the exercise condition judging unit 47 compares information on the body condition of the user received from the body condition acquiring unit 46 with a predetermined threshold, and judges the body condition of the user based on the comparison result. For example, the exercise condition judging unit 47 judges that the body of the user is under an excessive load when the information on the body condition of the user exceeds the predetermined threshold. In other words, the exercise condition judging unit 47 is means for comparing information on the body condition of a walking user with a predetermined threshold, and for judging the body condition of the walking user based on the comparison result.

Furthermore, the exercise condition judging unit 47 updates the exercise condition of the user based on the judgment result of the body condition of the user. For example, the exercise condition judging unit 47 determines a varying factor for varying an exercise condition depending on how much the body condition of the user exceeds the predetermined threshold, and varies an exercise condition by multiplying the exercise condition (for example, walking speed or calorie consumption) by the determined varying factor. The exercise condition judging unit 47 then transmits the updated exercise condition of the user to the route searching unit 41. In addition, the exercise condition judging unit 47 transmits the judgment result of the body condition of the user to the guidance information generating unit 48 and the presenting unit 42.

The guidance information generating unit 48 generates guidance information in accordance with the judgment result of the exercise condition of the user by the exercise condition judging unit 47, and transmits the generated guidance information to the presenting unit 42. The guidance information generating unit 48 generates the guidance information using, for example, information such as guidance texts associated with respective judgment results on the exercise condition of the user previously stored in predetermined storage unit.

For example, based on a judgment result of the exercise condition of the user received from the exercise condition judging unit 47 to the effect that the position of the user has deviated from a walking route, the guidance information generating unit 48 generates guidance information prompting the user to walk along the walking route. In addition, for example, based on a judgment result of the exercise condition of the user received from the exercise condition judging unit 47 to the effect that the difference between the walking speed of the user and the walking speed stored in the search condition data table exceeds a range of a predetermined threshold, the guidance information generating unit 48 generates guidance information prompting the user to reduce the walking speed since the user's walking speed is too high or guidance information prompting the user to increase the walking speed since the user's walking speed is too low.

Furthermore, for example, based on a judgment result of the exercise condition of the user received from the exercise condition judging unit 47 to the effect that the difference between the actual calorie consumption D and the reference calorie consumption D' exceeds a range of a predetermined threshold, the guidance information generating unit 48 generates guidance information prompting the user to increase (or reduce) the walking speed since the calorie consumption of the user is too low (or too high).

Moreover, for example, based on a judgment result of the exercise condition (body condition) of the user received from the exercise condition judging unit 47 to the effect that the body of the user is under an excessive load, the guidance information generating unit 48 generates guidance information prompting the user to, for example, lower the walking speed. In other words, the guidance information generating unit 48 is means for generating guidance information in accordance with a judgment result on the body condition of a walking user.

According to an embodiment of the walking exercise supporting device disclosed herein, in addition to the components illustrated in FIG. 14, the walking exercise supporting device 4 may be arranged so as to further include components for realizing the functions of the walking exercise supporting device 3 described earlier with reference to FIG. 11 (for example, the route information acquiring unit 31 and the exercise effect calculating unit 33).

Figure 15:
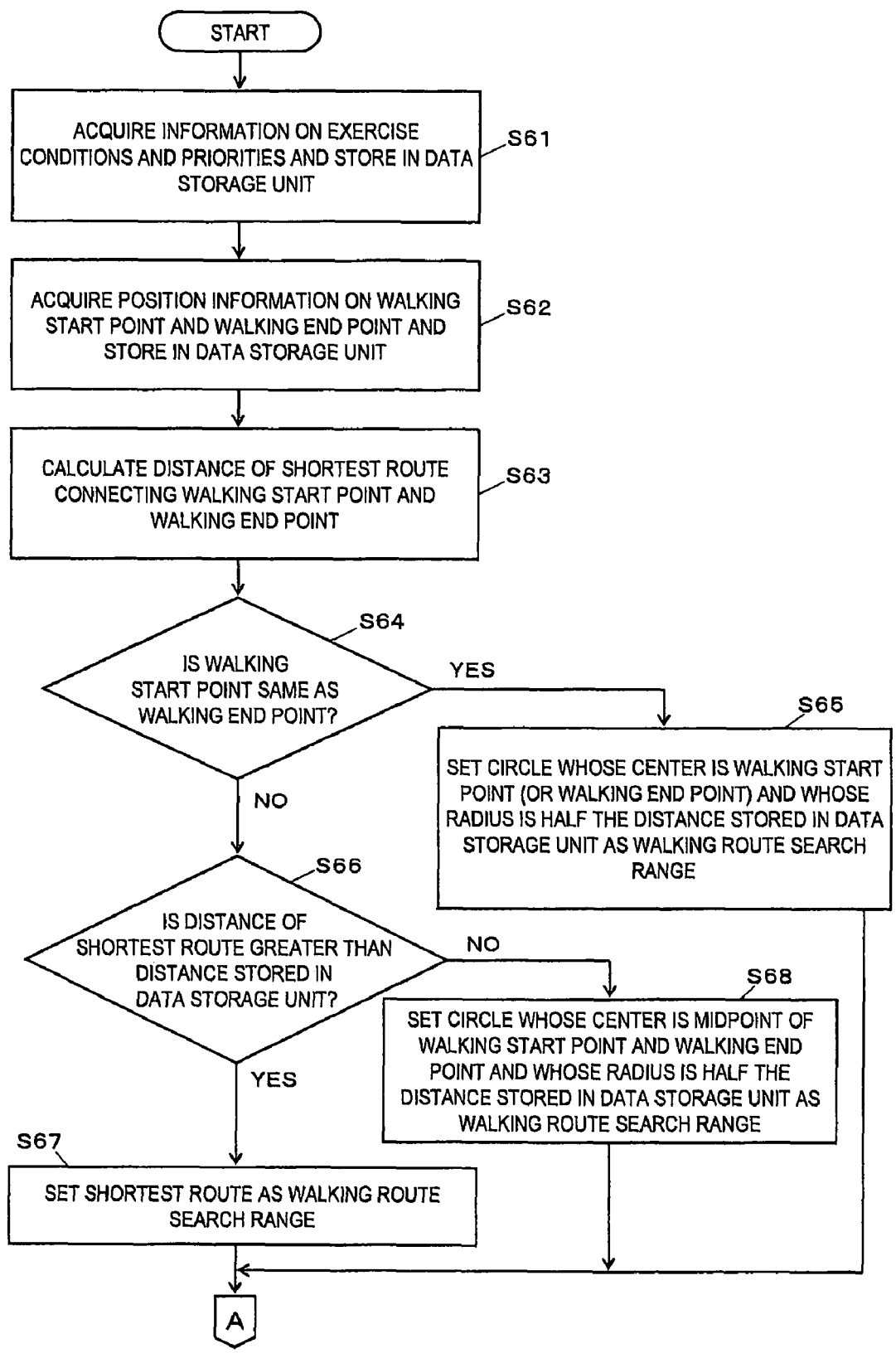
FIG. 15 is a diagram illustrating an example of a guidance information presentation processing flow and a walking route re-searching processing flow according to the fourth embodiment of the walking exercise supporting device disclosed herein.
Figure 16:
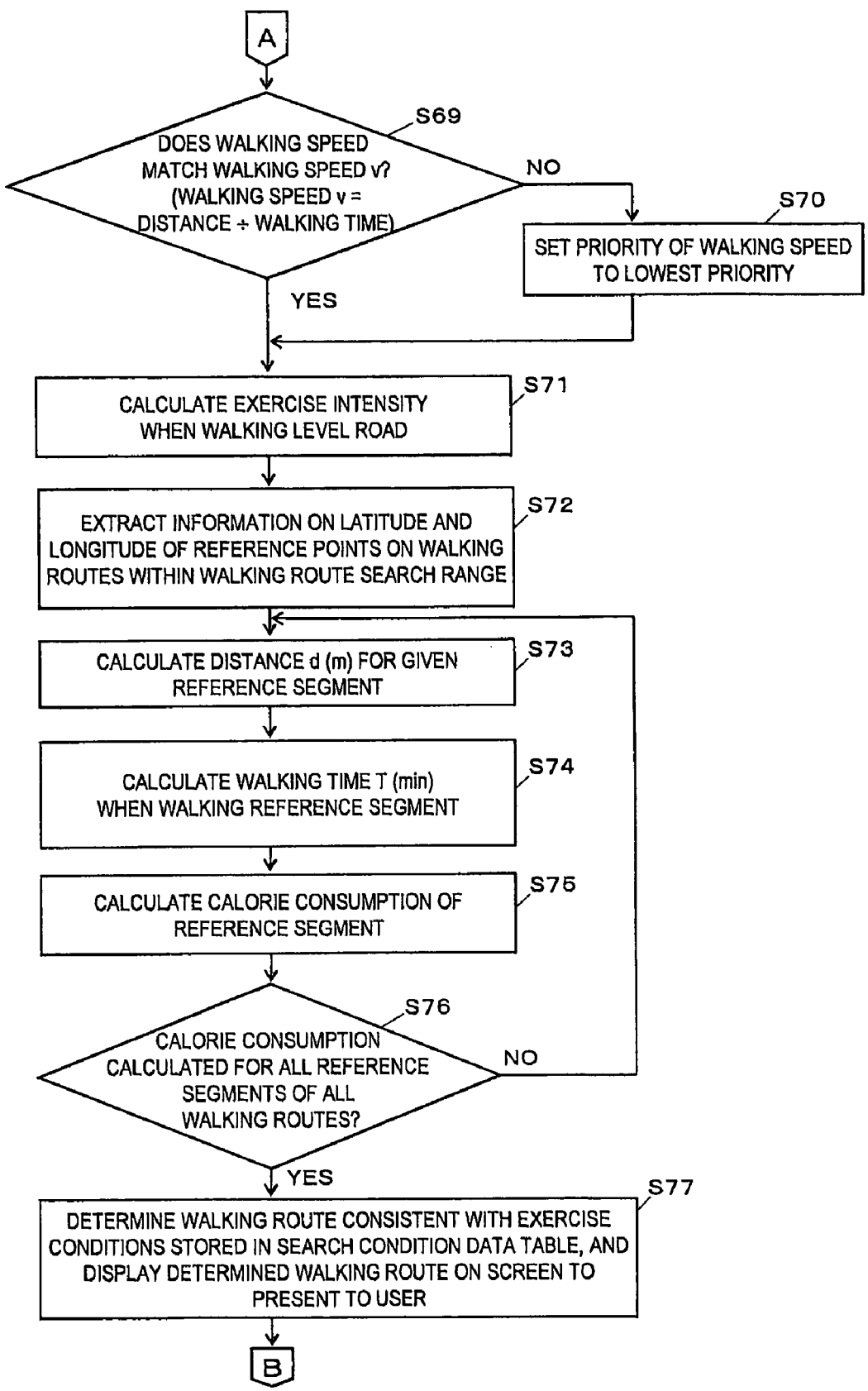
FIG. 16 is a diagram illustrating an example of a guidance information presentation processing flow and a walking route re-searching processing flow according to the fourth embodiment of the walking exercise supporting device disclosed herein.

FIG. 15 to FIG. 18 are diagrams illustrating flows of guidance information presentation processing and walking route re-searching processing according to the fourth embodiment of the walking exercise supporting device disclosed herein. The processing of step S61 to step S77 illustrated in FIG. 15 and FIG. 16 is processing for determining a walking route. First, in step S61 illustrated in FIG. 15, the exercise condition acquiring unit 11 acquires information on exercise conditions and priorities, and stores the same in the data storage unit 13 (step S61). In step S61, the exercise condition acquiring unit 11 further acquires information on the weight and the length of stride of the user, and stores the same in a predetermined buffer.

Next, the walking start point/walking end point acquiring unit 12 acquires position information on a walking start point and a walking end point, and stores the same in the data storage unit 13 (step S62).

Next, the route searching unit 41 acquires a distance and position information on a walking start point and a walking end point from the data storage unit 13, and calculates a distance of a shortest route connecting the walking start point and the walking end point based on the acquired position information on the walking start point and the walking end point and map information stored in the data storage unit 13 (step S63).

The route searching unit 41 judges whether the walking start point and the walking end point are the same (step S64). When the route searching unit 41 judges that the walking start point and the walking end point are the same, the route searching unit 41 sets a circle whose center is the walking start point (or the walking end point) and whose radius is half the distance stored in the data storage unit 13 as the walking route search range (step S65). Moreover, in step S65, when the priority of the number of steps is higher than the priority of the distance stored in the data storage unit 13, a value obtained by multiplying the length of stride of the user stored in the predetermined buffer by the number of steps may be arranged to be used instead of the distance stored in the data storage unit 13 (and this similarly applies to step S66, step S68, and step S69 described below).

When the route searching unit 41 judges that the walking start point and the walking end point are not the same, the route searching unit 41 judges whether the distance of the shortest route calculated in step S63 is greater than the distance stored in the data storage unit 13 (step S66).

When the route searching unit 41 judges that the distance of the shortest route is not greater than the distance stored in the data storage unit 13, the route searching unit 41 sets a circle whose center is the midpoint of the walking start point and the walking end point and whose radius is half the distance stored in the data storage unit 13 as the walking route search range (step S68).

When the route searching unit 41 judges that the distance of the shortest route is greater than the distance stored in the data storage unit 13, the route searching unit 41 sets the shortest route connecting the walking start point and the walking end point as the walking route search range (step S67).

Next, in step S69 illustrated in FIG. 16, the route searching unit 41 judges whether the walking speed (m/min) stored in the data storage unit 13 matches a speed v calculated using a calculating formula expressed as "a speed v=the distance (m) stored in the data storage unit 13÷the walking time (min) stored in the data storage unit 13" (step S69).

When the route searching unit 41 judges that the walking speed stored in the data storage unit 13 does not match the speed v calculated using the calculating formula expressed as "distance÷walking time", the route searching unit 41 sets the priority of the walking speed stored in the search condition data table in the data storage unit 13 to a lowest priority (step S70).

Next, the route searching unit 41 calculates an exercise intensity when walking a level road based on the speed v (walking speed) calculated using the calculating formula expressed as "distance÷walking time" and an exercise intensity calculating table previously stored in the data storage unit 13 (step S71).

Next, the route searching unit 41 extracts information on the latitude and longitude of reference points on walking routes within the walking route search range from the map information (step S72).

Next, the route searching unit 41 calculates a distance d (m) of a reference segment based on the information on the latitude and longitude of the reference points (step S73). In addition, the route searching unit 41 calculates a walking time T (min) when walking the reference segment by dividing the distance d by the speed v (step S74). Next, the route searching unit 41 calculates calorie consumption with respect to the reference segment (step S75).

Next, the route searching unit 41 judges whether calorie consumption has been calculated for all reference segments of all walking routes within the search range (step S76).

When the route searching unit 41 judges that there is a walking route or a reference segment for which calorie consumption has not been calculated, the flow returns to step S73.

When the route searching unit 41 judges that calorie consumption has been calculated for all reference points of all walking routes within the search range, the route searching unit 41 then determines a walking route that is consistent with exercise conditions stored in the search condition data table in the data storage unit 13 among walking routes within the search range, and presents the determined walking route to the user through screen display (step S77).

Moreover, similar walking route determination processing as the walking route determination processing described earlier with reference to step S21 to step S39 illustrated in FIG. 8 to FIG. 10 may be arranged to be performed in place of the processing of step S61 to step S77.

Figure 17:
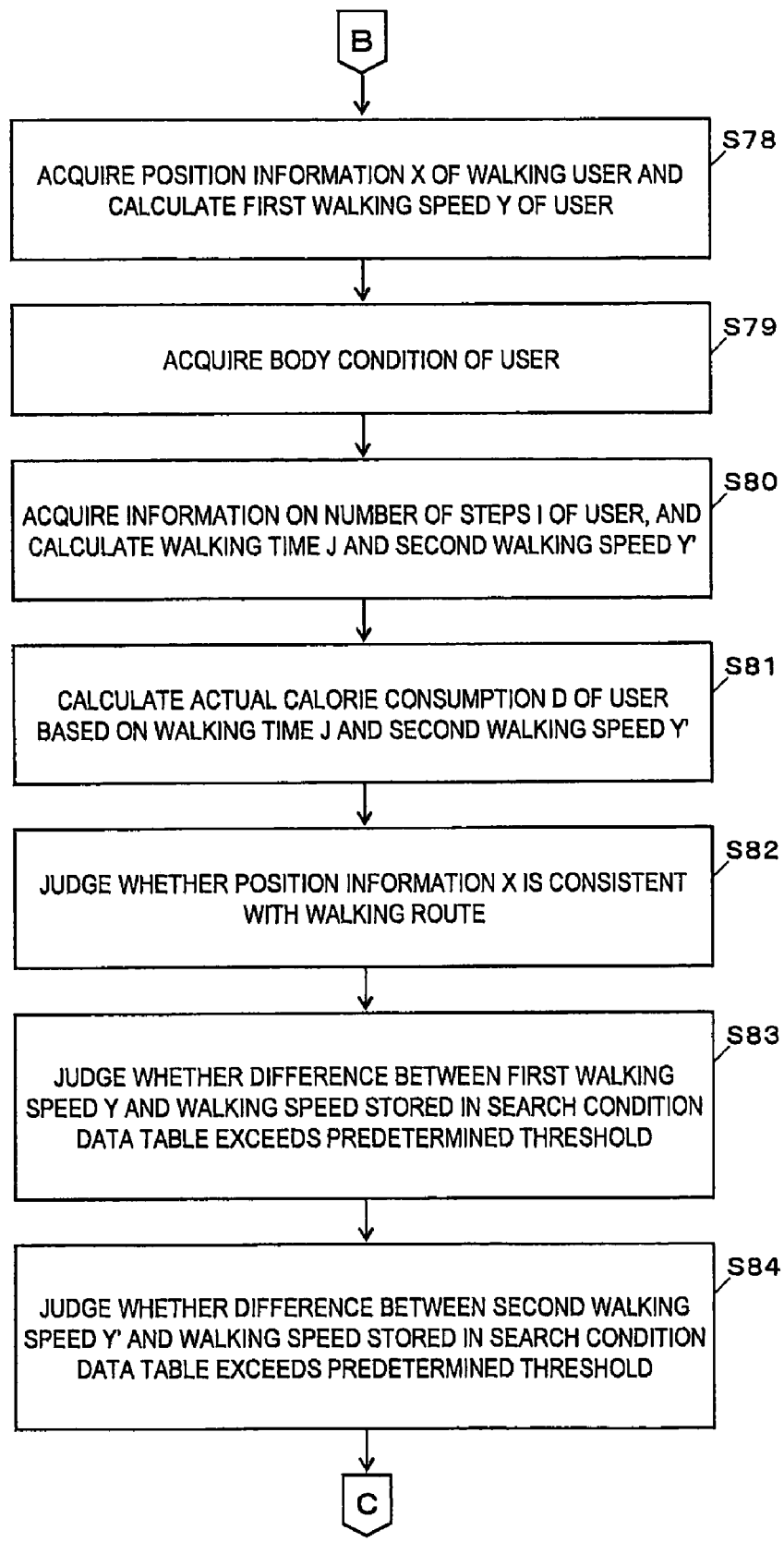
FIG. 17 is a diagram illustrating an example of a guidance information presentation processing flow and a walking route re-searching processing flow according to the fourth embodiment of the walking exercise supporting device disclosed herein.

In step S78 illustrated in FIG. 17, the position information acquiring unit 43 acquires position information X of a walking user and calculates a first walking speed Y of the user (step S78). Next, the body condition acquiring unit 46 acquires a body condition (for example, pulse rate) of the user (step S79). The walking condition acquiring unit 44 acquires information on the number of steps I of the user, and calculates the walking time J and the second walking speed Y' described earlier (step S80).

The calorie consumption calculating unit 45 calculates an actual calorie consumption D of the user based on the walking time J and the second walking speed Y' (step S81).

Next, the exercise condition judging unit 47 judges whether the position information X is consistent with the walking route (step S82).

In addition, the exercise condition judging unit 47 judges whether the difference between the first walking speed Y and the walking speed stored in the search condition data table exceeds a range of a predetermined threshold (step S83). The exercise condition judging unit 47 judges whether the difference between the second walking speed Y' and the walking speed stored in the search condition data table exceeds a range of a predetermined threshold (step S84).

Figure 18:
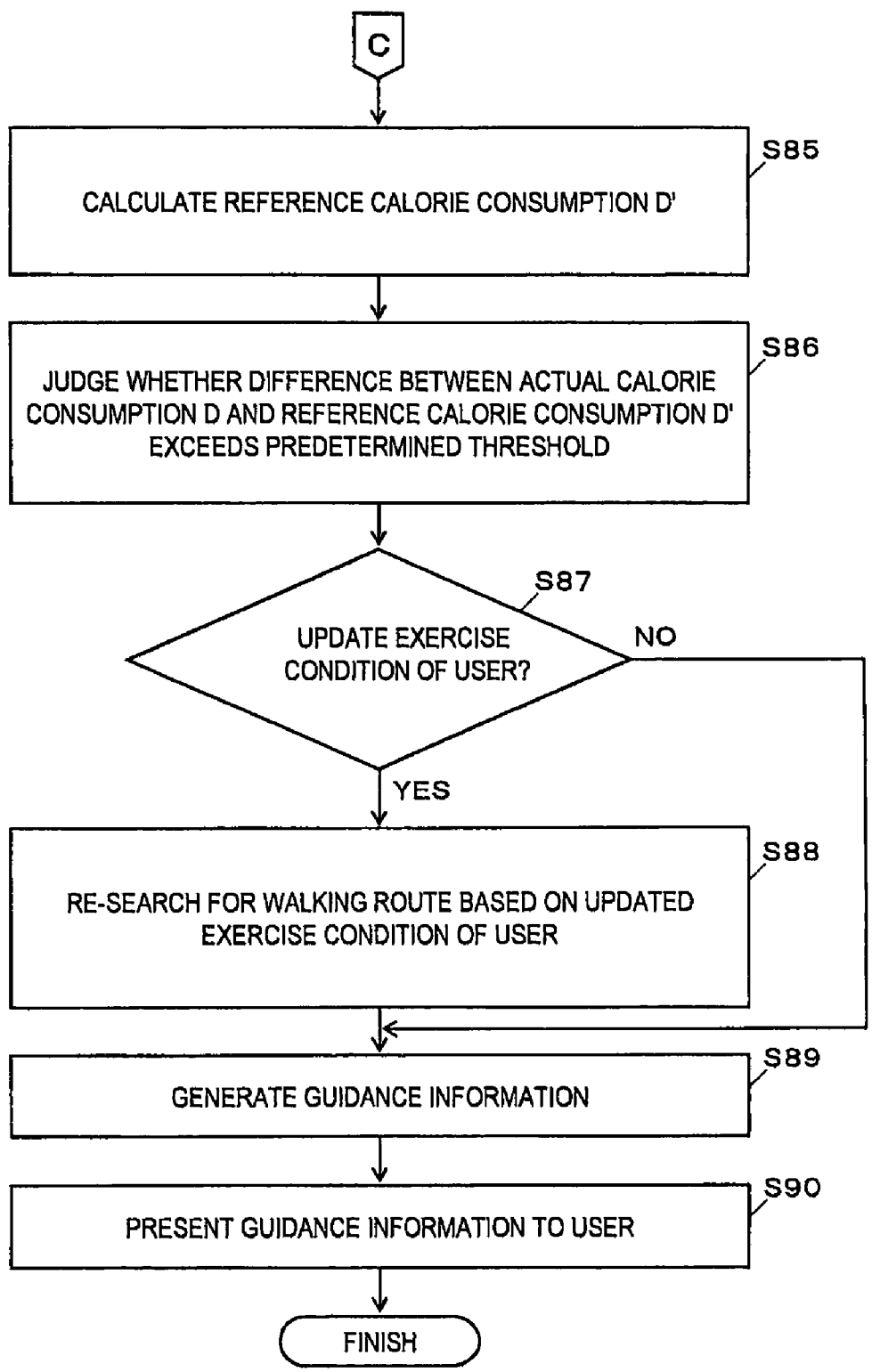
FIG. 18 is a diagram illustrating an example of a guidance information presentation processing flow and a walking route re-searching processing flow according to the fourth embodiment of the walking exercise supporting device disclosed herein.

In step S85 illustrated in FIG. 18, the exercise condition judging unit 47 calculates an aggregate of calorie consumption of all reference segments from the walking start point to the reference segment corresponding to the current position of the user as the reference calorie consumption D' (step S85). The exercise condition judging unit 47 then judges whether the difference between the actual calorie consumption D and the reference calorie consumption D' exceeds a range of a predetermined threshold (step S86).

Next, the exercise condition judging unit 47 compares information on the body condition of the user received from the body condition acquiring unit 46 with a predetermined threshold, and based on the comparison result, judges whether the body condition of the user is to be updated (step S87). When the exercise condition judging unit 47 judges not to update the exercise condition of the user, the flow proceeds to the processing of step S89. When the exercise condition judging unit 47 judges to update the exercise condition of the user, the route searching unit 41 re-searches a walking route based on the updated exercise condition of the user (step S88).

The guidance information generating unit 48 then generates guidance information in accordance with the judgment result of the exercise condition of the user by the exercise condition judging unit 47 (step S89), and transmits the same to the presenting unit 42. The presenting unit 42 then presents guidance information received from the guidance information generating unit 48 to the user (step S90).

The walking exercise supporting devices 1, 3, and 4, as well as functions of the respective units thereof are realized by a CPU and a program executed on the CPU. The program for realizing the present invention can be stored in a computer-readable storage medium such as a semiconductor memory, a hard disk, a CD-ROM, and a DVD, and is provided either recorded on such a storage medium or through transmission/reception using a network via a communication interface.

As described above, in an aspect of the present invention, the walking exercise supporting device disclosed herein can search for an appropriate walking route under exercise conditions such as a walking time, calorie consumption, walking speed, and distance.

In another aspect of the present invention, the walking exercise supporting device disclosed herein can present calorie consumption per walking speed to a user when the user walks along a specified walking route.

In another aspect of the present invention, the walking exercise supporting device disclosed herein can search for a walking route based on an exercise condition, and when a user is walking the walking route, present, to the user, whether the user is able to perform exercise according to the exercise condition used for searching for the walking route.

In another aspect of the present invention, the walking exercise supporting device disclosed herein can determine a body condition of a walking user, and based on the judgment results of the body condition of the user, present guidance information to the user.

In another aspect of the present invention, the walking exercise supporting device disclosed herein can determine a body condition of a walking user, change an exercise condition based on the judgment results of the body condition of the user, and re-search for a walking route based on the changed exercise condition.

With the walking exercise supporting device according to the present invention, it is now possible to search for an appropriate walking route under an exercise condition such as a walking time, calorie consumption, number of steps, walking speed, and distance.

In addition, with the walking exercise supporting device according to the present invention, it is now possible to present calorie consumption per walking speed to a user when the user walks along a specified walking route.

Furthermore, with the walking exercise supporting device according to the present invention, it is now possible to search for a walking route based on an exercise condition, and when a user is walking the walking route, present whether the user is able to perform exercise according to the exercise condition used for searching for the walking route to the user.

Moreover, with the walking exercise supporting device according to the present invention, it is now possible to judge body conditions of a walking user, and based on the judgment results of the body conditions of the user, present guidance information to the user. Therefore, for example, when the body of a user is under an excessive load such as when the user has a fast pulse, it is now possible to prompt the user to lower the walking speed.

In addition, with the walking exercise supporting device according to the present invention, it is now possible to judge body conditions of a walking user, change an exercise condition based on the judgment results of the body conditions of the user, and re-search for a walking route based on the changed exercise condition. Therefore, for example, when the body of a user is under an excessive load, it is now possible to re-search for a route that poses a lesser load on the body of the user and present a new walking route obtained as a result of the re-search to the user.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A walking exercise supporting device for supporting a walking exercise of a user, comprising:
    an exercise condition acquiring unit for acquiring information on at least a walking time, walking speed, and distance as an exercise condition, calculating calorie consumption based on an exercise intensity calculating table setting correspondence information between walking speeds and exercise intensities, and storing the acquired information and the calorie consumption in a storage unit;
    a walking start point/walking end point acquiring unit for acquiring position information on a walking start point and a walking end point and storing the same in a storage unit;
    a walking route searching unit for searching for and determining a walking route to be presented to the user based on the exercise condition stored in the storage unit, position information on the walking start point and the walking end point, and map information previously stored in the storage unit; and
    a presenting unit for presenting a walking route determined by the walking route searching unit to the user.

2. The walking exercise supporting device according to claim 1, wherein
    the walking route searching unit: determines a walking route search range based on the distance, position information on the walking start point and the walking end point, and the map information stored in the storage unit; calculates a walking time, calorie consumption, and distance corresponding to each walking route within the search range based on the walking time, distance, and map information stored in the storage unit; and determines a walking route whose calculated walking time, calorie consumption, and distance are respectively consistent with the walking time, calorie consumption, and distance stored in the storage unit as the walking route to be presented to the user.

3. The walking exercise supporting device according to claim 1, wherein
    the exercise condition acquiring unit further sets priorities for the respective pieces of information on the walking time, calorie consumption, and distance entered as an exercise condition, and
    the walking route searching unit: determines a walking route search range based on the distance, position information on the walking start point and the walking end point, and the map information stored in the storage unit; calculates a walking time, calorie consumption, and distance corresponding to each walking route within the search range based on the walking time, distance, and map information stored in the storage unit; selects a search criterion from the walking time, calorie consumption, and distance stored in the storage unit based on the set priorities; and determines a walking route corresponding to a walking time, calorie consumption, or distance consistent with the selected search criterion as the walking route to be presented to the user.

4. The walking exercise supporting device according to claim 1, wherein
the exercise condition acquiring unit acquires information on at least a walking time, calorie consumption, walking speed, distance, and maximum gradient of a walking route as the exercise condition, and
the walking route searching unit: determines a walking route search range based on the distance, position information on the walking start point and the walking end point, and map information stored in the storage unit; calculates a walking time, calorie consumption, distance, and maximum gradient corresponding to each walking route within the search range based on the walking time, distance, and map information stored in the storage unit; and determines a walking route whose calculated walking time, calorie consumption, distance, and maximum gradient are respectively consistent with the walking time, calorie consumption, distance, and maximum gradient stored in the storage unit as the walking route to be presented to the user.

5. The walking exercise supporting device according to claim 1, wherein
the exercise condition acquiring unit acquires information on at least a walking time, calorie consumption, walking speed, distance, and maximum gradient of a walking route as the exercise condition, and sets priorities for the respective pieces of information on the entered walking time, calorie consumption, distance, and maximum gradient, and
the walking route searching unit: determines a walking route search range based on the distance, position information on the walking start point and the walking end point, and the map information stored in the storage unit; calculates a walking time, calorie consumption, a distance, and a maximum gradient corresponding to each walking route within the search range based on the walking time, distance, and map information stored in the storage unit; selects a search criterion from the walking time, calorie consumption, distance, and maximum gradient stored in the storage unit based on the set priorities; and determines a walking route corresponding to a walking time, calorie consumption, distance, or maximum gradient consistent with the selected search criterion as the walking route to be presented to the user.

6. The walking exercise supporting device according to claim 1, further comprising:
a route information acquiring unit for acquiring information on a walking route from a walking start point to a walking end point, and extracting, from map information previously stored in the storage unit, information on the latitude, longitude, and height of respective reference points on the entered walking route and storing the same in the storage unit; and
a calorie consumption calculating unit for calculating gradients between respective reference points based on the information on the latitude, longitude, and height of respective reference points stored in the storage unit, and calculating, based on the calculated gradients between the respective reference points and respective walking speeds obtained by varying the value of a predetermined walking speed, the calorie consumption of the user when walking the walking route entered by the route information acquiring unit for each of the walking speeds, wherein
the presenting unit further presents the calculated calorie consumption for each walking speed to the user.

7. The walking exercise supporting device according to claim 1, further comprising:
a position information acquiring unit for acquiring position information on a walking user at predetermined time intervals, and based on the acquired position information on the user per predetermined time intervals, calculating a walking speed of the walking user; and
a judging unit for judging whether the acquired position information on the walking user is consistent with a walking route determined by the walking route searching unit, and judging whether the calculated walking speed of the walking user is consistent with the walking speed stored in the storage unit by the exercise condition acquiring unit, wherein the presenting unit further presents the respective judgment results by the judging unit to the walking user.

8. The walking exercise supporting device according to claim 1, further comprising:
a body condition acquiring unit for acquiring information on the body condition of a walking user;
a body condition judging unit for comparing the acquired information on the body condition of the walking user with a predetermined threshold and, based on the comparison result, judging the body condition of the walking user; and
a guidance information generating unit for generating guidance information in accordance with the judgment result of the body condition of the walking user, wherein
the presenting unit presents the generated guidance information in accordance with the judgment result of the body condition of the walking user to the user.

9. The walking exercise supporting device according to claim 8, wherein
the body condition judging unit updates the exercise condition of a walking user based on the judgment result of the body condition of the walking user, and
the walking route searching unit further re-searches for a walking route to be presented to the user using the updated exercise condition of the user.

10. An apparatus, comprising:
an exercise condition acquiring unit that acquires an exercise condition having a condition about an exercise to be done accompanied an act of traveling by using body parts of a user;
a position information acquiring unit that acquires position information including a designation position where the user is to start an exercise according to the exercise condition;
a search range determination unit that acquires an exercise distance being enough to fulfill the exercise condition, and determines a search range based on the exercise distance and the designation position; and
a route searching unit that searches a route being enough to fulfill the exercise condition by retrieving map information within the search range, both a start point and an end point of the route being same position which is based on the designation position.

* * * * *

UNITED STATES PATENT AND TRADEMARK OFFICE
CERTIFICATE OF CORRECTION

| | | |
|---|---|---|
| PATENT NO. | : 8,021,271 B2 | Page 1 of 1 |
| APPLICATION NO. | : 12/585954 | |
| DATED | : September 20, 2011 | |
| INVENTOR(S) | : Kouichirou Kasama et al. | |

It is certified that error appears in the above-identified patent and that said Letters Patent is hereby corrected as shown below:

Title Page, Column 1, after Prior Publication Data, insert

-- (30)    Foreign Application Priority Data

March 30, 2007 (JP) ............. PCT/2007/057052 --.

Signed and Sealed this
Eighteenth Day of September, 2012

David J. Kappos
*Director of the United States Patent and Trademark Office*